(12) United States Patent
Warnick et al.

(10) Patent No.: US 12,373,856 B1
(45) Date of Patent: *Jul. 29, 2025

(54) SYSTEM AND METHOD FOR INCENTIVIZING TASK PERFORMANCE USING TOKEN-BASED DIGITAL MEDIA ACCESS

(71) Applicant: UIPCO, LLC, San Antonio, TX (US)

(72) Inventors: Mark Paxman Warnick, San Antonio, TX (US); Will Kerns Maney, Jr., New York City, NY (US); Elena Marie Carrasco, Converse, TX (US); Ravi Durairaj, San Antonio, TX (US); Donald Nathaniel Holloway, III, San Antonio, TX (US); Roberto Virgillio Jolliffe, San Antonio, TX (US); Surender Kumar, Palatine, IL (US); Jeanie Graciela Lopez, San Antonio, TX (US); Ivan Ortiz, Little Elm, TX (US); Nathan Lee Post, Rockport, TX (US); Nolan Serrao, Plano, TX (US); David Michael Schlittler, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/326,482

(22) Filed: May 31, 2023

(51) Int. Cl.
*G06Q 30/0207* (2023.01)
*G06Q 20/36* (2012.01)

(52) U.S. Cl.
CPC ..... *G06Q 30/0207* (2013.01); *G06Q 20/3672* (2013.01)

(58) Field of Classification Search
CPC .............. G06Q 30/0207; G06Q 20/3672
See application file for complete search history.

(56) References Cited

U.S. PATENT DOCUMENTS

| | | | | |
|---|---|---|---|---|
| 4,972,504 | A * | 11/1990 | Daniel, Jr. | G06Q 30/0205 455/2.01 |
| 2014/0297348 | A1* | 10/2014 | Ellis | G06Q 10/063114 705/7.15 |
| 2021/0248560 | A1* | 8/2021 | Rajendran | G06Q 40/02 |
| 2022/0198562 | A1* | 6/2022 | Cella | G06Q 40/04 |
| 2023/0055618 | A1* | 2/2023 | Jakobsson | G06Q 20/3674 |
| 2024/0020683 | A1* | 1/2024 | Bacon | G06Q 20/3674 |

OTHER PUBLICATIONS

U.S. Appl. No. 18/326,523, filed May 31, 2023.

* cited by examiner

*Primary Examiner* — Azam A Ansari
(74) *Attorney, Agent, or Firm* — Plumsea Law Group, LLC

(57) ABSTRACT

A transactional method and system of incentivizing task performance using token-based exchange for digital media access. The system and method are configured to reward a person with electronic tokens for tasks that are performed and verified by the system. These tokens can then be exchanged by the user for access to desired digital media. Verification can involve the use of natural language processing and image comparison algorithms to determine whether a particular task has been successfully completed.

10 Claims, 12 Drawing Sheets

SYSTEM AND METHOD FOR INCENTIVIZING TASK PERFORMANCE USING TOKEN-BASED DIGITAL MEDIA ACCESS

TECHNICAL FIELD

The present disclosure generally relates to the promotion and reinforcement of target behaviors, and specifically to a method and system for providing a pre-designated reward in exchange for the performance of a particular service or task.

BACKGROUND

Extrinsic motivation can play a large role in individual behavioral performance. Often, a person is willing to modify his or her behavior either to perform better or complete the task given when extrinsic motivation is provided. Typically, to nurture good behaviors or encourage repetitive tasks among children (e.g., house chores, or to do their schoolwork) or other tasks they do not usually find intrinsic motivation to do by themselves, an extrinsic type of motivation is required. Although tracking and reward systems are available, they require a parent to provide input and/or verification that the task was completed. In addition, reward systems are typically static, offering little variety, which can become mundane and reduce the incentive to perform the tasks. Similarly, while these electronic methods may provide a minor amount of additional structure and formality to the process, they still lack a robust set of tracking and reward capabilities.

There is a need in the art for a system and method that addresses the shortcomings discussed above.

SUMMARY

In one aspect, a method of incentivizing task performance is disclosed. The method includes a first step of receiving, via an application for a task management system, a selection of a first task by a first user, and a second step of receiving, at the task management system, first sensor data. A third step includes automatically verifying, at the task management system, completion of the first task based on the first sensor data, and a fourth step includes automatically determining, at the task management system, that the first task is associated with a first token reward quantity. In addition, a fifth step includes automatically generating, in response to the verification, a first number of electronic tokens equivalent to the first token reward quantity, and a sixth step includes automatically adding the first number of electronic tokens to an electronic wallet for the first user. A seventh step includes receiving, via the application, a request for access to a first digital media, and an eighth step includes automatically determining, at the task management system, access to the first digital media is regulated and contingent on an exchange for a second number of tokens. In a ninth step the method includes automatically presenting, via the application, a request for the first user to approve an exchange of the second number of tokens available in the electronic wallet for access to the first digital media. A tenth step includes receiving, via the application and at the task management system, an approval of the exchange, and an eleventh step includes automatically unlocking or authorizing access to the first digital media and providing to the first user, by the task management system and at a first computing device, a first access session to the first digital media.

In another aspect, a method of incentivizing task performance can include a first step of receiving, via an application for a task management system, a selection of a first task by a first user, and a second step of automatically activating, in response to receiving the selection, a first sensor device to monitor performance of the first task. A third step can include receiving, via the application and from the first user, an indication that the first task is complete, a fourth step includes automatically deactivating, in response to receiving the indication, the first sensor device. Furthermore, the method can include a fifth step of verifying, at the task management system, completion of the first task based on first sensor data obtained via the first sensor device during its activation, and a sixth step of receiving, via the application, a request for access to a first digital media. A seventh step includes automatically determining, at the task management system, access to the first digital media is regulated and contingent on an exchange for a first number of tokens, and an eight step includes automatically presenting, via the application, a request for the first user to approve an exchange the first number of tokens available in an electronic wallet associated with the first user. A ninth step includes receiving, via the application and at the task management system, an approval of the exchange, and a tenth step includes automatically providing to the first user, by the task management system and at a first computing device, a first access session to the first digital media.

In another aspect, a system for incentivizing task performance includes a processor and machine-readable media. The machine-readable media include instructions which, when executed by the processor, cause the processor to: (1) receive, via an application for a task management system, a selection of a first task by a first user; (2) receive, at the task management system, first sensor data; (3) verify, at the task management system, completion of the first task based on the first sensor data; (4) identify, at the task management system, that the first task is associated with a first token reward quantity; (5) automatically generate, in response to the verification, a first number of electronic tokens equivalent to the first token reward quantity; (6) add the first number of electronic tokens to an electronic wallet for the first user; (7) receive, via the application, a request for access to a first digital media; (8) determine, at the task management system, access to the first digital media is regulated and contingent on an exchange for a second number of tokens; (9) present, via the application, a request for the first user to approve an exchange of the second number of tokens available in the electronic wallet for access to the first digital media; (10) receive, via the application and at the task management system, an approval of the exchange; and (11) provide to the first user, by the task management system and at a first computing device, a first access session to the first digital media.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
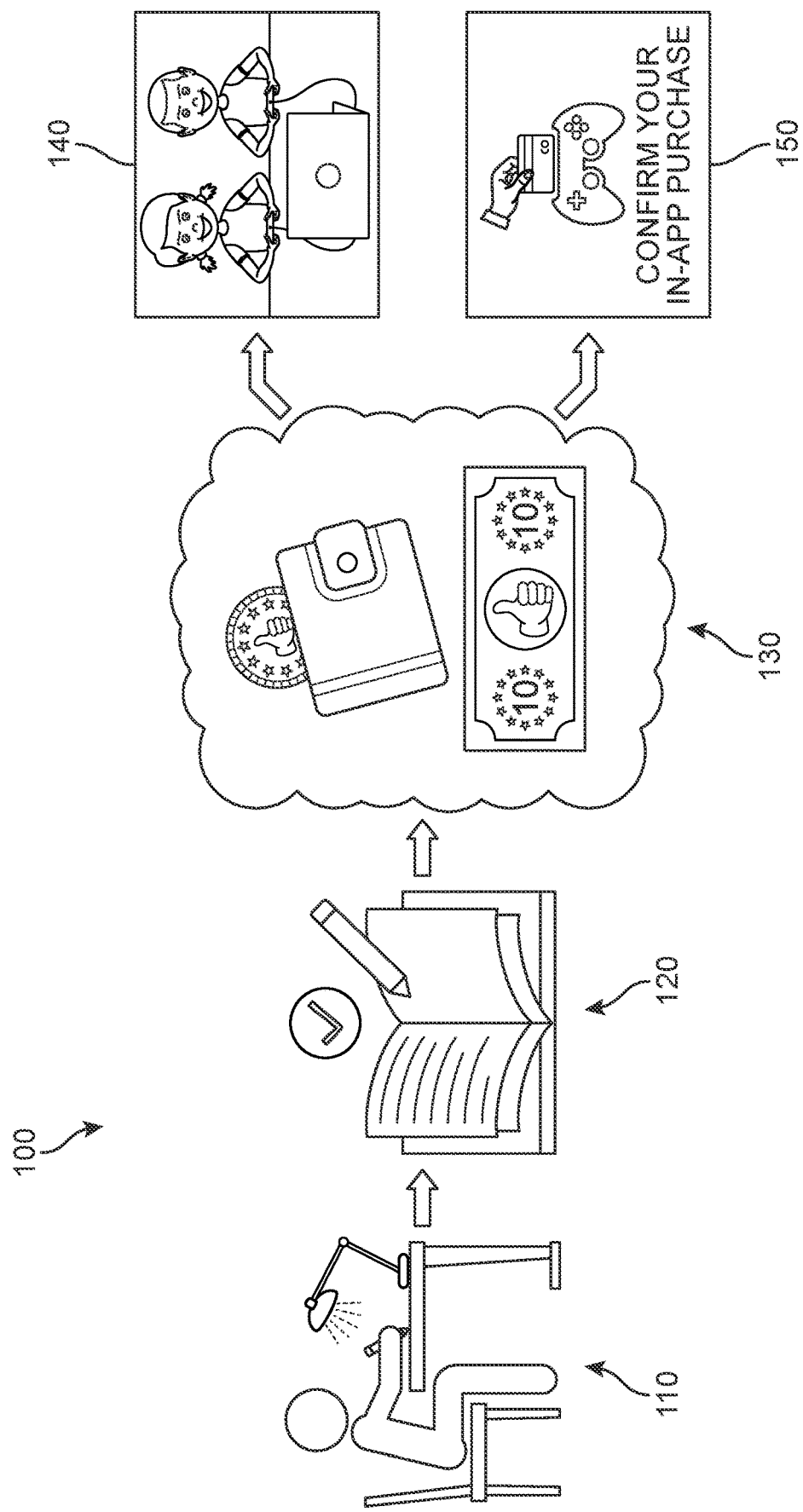
FIG. 1 is an overview of a scenario in which a user obtains access and/or currency in exchange for tokens earned for performance of a task, according to an embodiment.

The embodiments provide a method and system for intelligent monitoring and incentivizing of task performance, particularly as related to children of a household. As will be described in greater detail below, in some embodiments, the system is configured to reinforce certain behaviors by controlling access to computer games that a child would like to play or applications that the child would like to use. In some other embodiments, the system is alternatively or additionally configured to reinforce certain behaviors by controlling access to currencies or other tokens/ entities with value that the children would like to earn. For example, one or more sensors can gather information which establish whether individuals such as children have performed certain desirable behaviors. In response to detecting and identifying the desirable behaviors, the system can automatically provide the child with tokens (such as altcoin stored in a wallet of the children). In one embodiment, these tokens would have no inherent real-world value, but serve as a proof that the child has acted in a certain way that should be rewarded.

In different embodiments, these tokens could be used in conjunction with an access control system. In some embodiments, the children could exchange the tokens for access privileges to applications they would like to use. In one example, children could exchange tokens for a certain amount of time to access a video game if the children complete a homework assignment. Alternatively, in some embodiments, the system could lock the children out of a service until the system determines that the children have completed a task. For example, the children might be unable to use a social media application until they demonstrate that they have cleaned their room.

In still other embodiments, these tokens could be used in conjunction with assets of the parents to provide valuable resources in exchange for the children's tokens. In some embodiments, the children might wish to convert their tokens into a currency, a cryptocurrency having actual value, or another entity having actual value; thus, a child could acquire enough tokens to redeem for a particular reward. In one example, children could use the tokens they earn in exchange for official digital currency in an online game once the system confirms that the child has a sufficient quantity of valid tokens. In another example, the child could provide a wallet address to the system, and the system could confirm that the child has earned a sufficient quantity of tokens. In different embodiments, once the system confirms there are enough tokens, the system could use a private key of the parent to automatically sign/authorize or otherwise authenticate a transaction that uses a currency of the parent to pay for the requested item. For example, the parent's private key could sign for a transfer of dollars or Bitcoin to pay for the in-game currency that the child has earned using tokens. Thus, the system enables a child to earn tokens with no inherent value but allows a parent to lend value to the tokens to by authenticating a transaction that causes the parent's resources to provide real-world value to the child's tokens.

Unlike traditional approaches where a parent or supervisor must monitor and verify outcomes and subsequently mete out the rewards—forcing the role of enforcer on the parent rather than a supportive coach to increase the positive outcomes—the proposed systems can automatically determine when a task has been completed and, in response, offer predesignated rewards such as access to digital media and entertainment and/or electronic currency or tokens. It can be appreciated that in many cases, parents are unable to monitor the performance of a task (e.g., chores) nor can they be always available to implement the rewards that were earned following completion of the chore, activity, or behavior outcome. This approach allows the process to occur without requiring interventions or verification from the parent. In addition, parents often desire that the reward be restricted in some way-rather than offer money as an incentive, which may be spent in any number of unmonitored ways, the proposed system-provides a measured, monitored access to the rewards.

For purposes of clarity, an overview of one embodiment of the proposed systems and methods is illustrated with reference to FIG. 1. In FIG. 1, a schematic diagram presents an example of process 100 by which a task may be incentivized using tokens in accordance with one embodiment of the proposed systems. In a first stage 110, a client end-user (e.g., a child) is shown completing their homework, which is a task designated for completion in the system. For purposes of this application, references to a "child" should be understood to include children in a typical family relationship (e.g., offspring) as well as the broader sense of a child as a person who is being supervised or is a participant of the behavior management approach described herein, or any other person in a supervised capacity, such as employees, inmates/prisoners, convicts on parole, members of a for-profit or nonprofit organization that seek to establish incentivization programs, and even individuals looking to use the system to manage and reward their own behavior. Similarly, the term "parent" can refer to parents in a typical family relationship (e.g., father, mother), as well as the broader sense of parent as a person who is responsible for children, including extended family members, guardians, godparents, foster parents, caregivers, teachers, etc., or other persons who have a supervisory role and are provided access to the higher-level settings of the behavior management system with respect to one or more charges. In a second stage 120, the system verifies the performance of the task, and in response, automatically generates the appropriate quantity of tokens in a third stage 130, which may be stored in an electronic wallet linked to and accessibly by the child. In different embodiments, the child can then elect to 'spend' their tokens, for example by requesting an allotment of time for video games (or an unlocking of a device for the rest of the day) as represented in a fourth stage 140, and/or conversion of the tokens into some type of currency that has value and can be used to obtain real-world products or services, such as in-app purchases (see a fifth stage 150). In a second stage 120, the system verifies the performance of the task, and in response, automatically generates the appropriate quantity of tokens in a third stage 130, which may be stored in an electronic wallet linked to and accessibly by the child. In different embodiments, the child can then elect to 'spend' their tokens, for example by requesting an allotment of time for video games (or an unlocking of a device for the rest of the day) as represented in a fourth stage 140, and/or conversion of the tokens into some type of currency that has value and can be used to obtain real-world products or services, such as in-app purchases (see a fifth stage 150).

Figure 2:
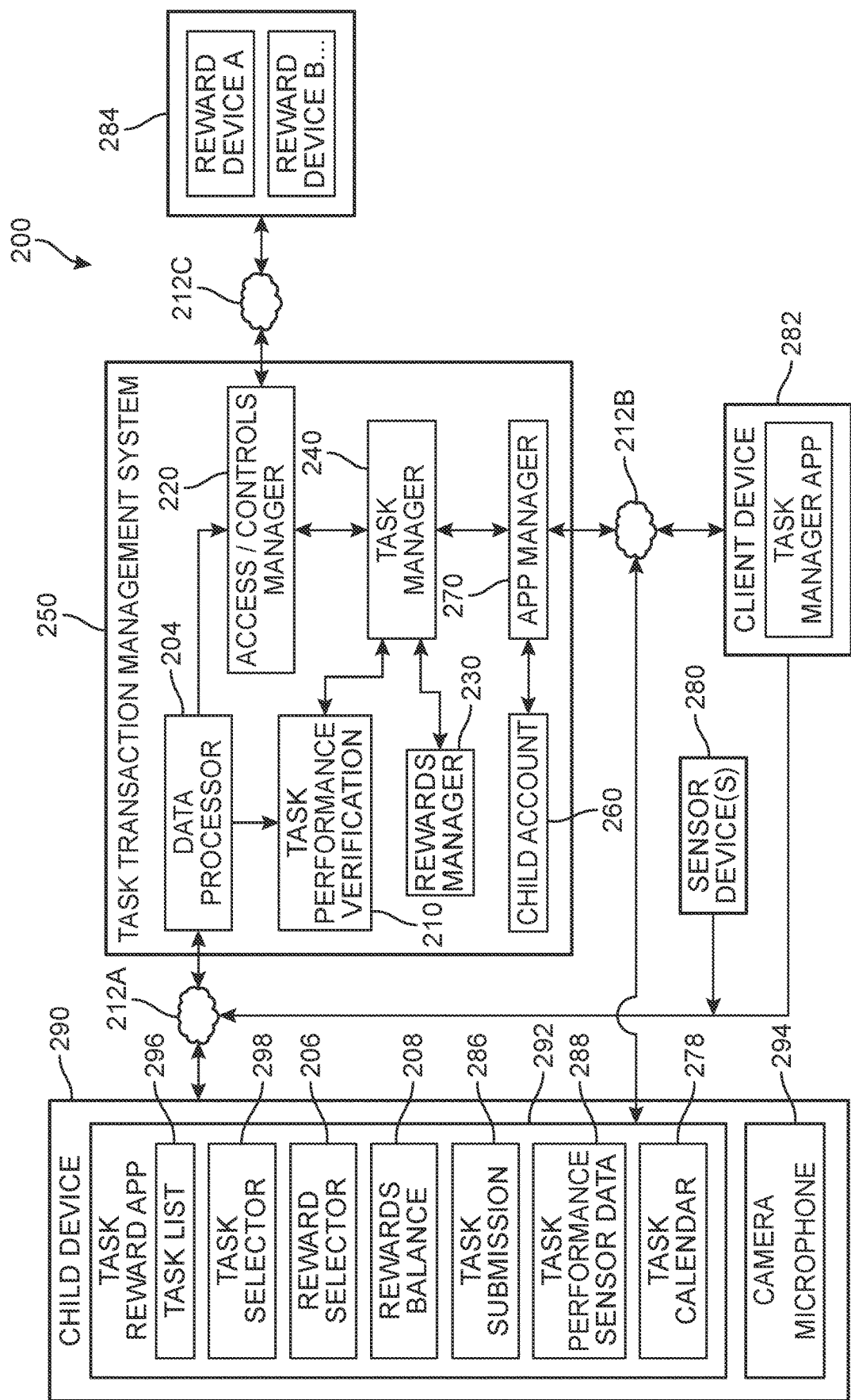
FIG. 2 is a schematic diagram of an environment for implementation of a task transaction system, according to an embodiment.

An illustrative example of an environment 200 in which a task transaction management system (also referred to as "task management system" or simply "system") 250 may be implemented is shown in FIG. 2. Further details regarding the system 250 will also be discussed with reference to FIG. 3. As shown in FIG. 2, system 250 can be in communication with one or more computing devices (e.g., one or more parent client devices 282, one or more child devices 290, various sensor devices 280, various reward devices 284, etc.) and receive inputs 202 that can trigger automated responses, depending on a given child's preferences (and/or the guardian's preferences), such as generating a predesignated quantity of tokens that can be used to authorize and/or execute the exchange of tokens for rewards 380 (see FIG. 3) by a child user. While the various components of system 250 can reside in a cloud network and stored on a cloud-based server, in other embodiments, the components can alternatively or additionally be available in the client device memory. In different embodiments, the client devices and system 250 are configured to communicate with one another, for example via a Wi-Fi, cellular, or other network connection 250.

In different embodiments, various components of environment 200 are configured to communicate over networks 212a, 212b, 212c (collectively referred to as networks 212), could include one or more Wide Area Networks (WANs), Wi-Fi networks, Bluetooth or other Personal Area Networks, cellular networks, as well as other kinds of networks. It may be appreciated that different devices could communicate using different networks and/or communication protocols. The devices can include computing or smart devices as well as more simple speakers or light-emitting devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections.

For purposes of convenience, some terms may be used in the disclosure and claims to better describe certain aspects of the embodiments. For example, the term sensor device or monitoring device in this specification relates to any computing device system that collects sensor data for a user in order to enable the system 250 to determine a user's activity and/or whether a particular task has been successfully completed or performed. It should be understood that there may be standalone monitoring/sensor devices 280 that are configured to monitor performance of the task, and the user devices (e.g., child device 290, client device 282, reward devices 284) can also serve as monitoring devices. In other words, each computing device can be used to collect and/or obtain data that may be used by the system 250 to identify the task (chore) and whether the task has been adequately accomplished. Sensor devices 280 can also include IoT (internet-of-things) devices and other smart computing devices. In different embodiments, one or more of these computing devices may include provisions for communicating with, and processing information from, nearby devices as well as with the system 250. Each device may include one or more processors and memory. Memory may comprise a non-transitory computer readable medium. Instructions stored within memory may be executed by the one or more processors. In some embodiments, the parent can identify which physical spaces in a household include a sensor device and what type of sensor data can be collected by that sensor device and/or what task a particular sensor device situated in a specific physical space is designated to monitor. Thus, each sensor device can include a room classification or label and/or a task classification or label which is stored in a sensor device repository of the task manager 240. This information can be access by the system 250 when a task is selected by the child to determine which sensor device to activate and/or request data from for purposes of task verification.

In different embodiments, the environment 200 can also include provisions for receiving data generated by user devices and/or IoT or other smart devices associated with the end-user. For example, the end-user (e.g., the parent) can authorize the system to interact directly with one or more smart devices. Smart devices can be connected to a network via different wireless protocols such as Bluetooth, Zigbee, NFC, Wi-Fi, LiFi, 3G, etc., can receive commands, and perform different functions and execute various operations in response to the commands. Such interactions are usually performed in the vicinity of the smart device, and/or via a user device that is configured to provide instructions to the smart device. Some examples of smart devices include cameras, motion sensors, thermostats, lights and bulbs, speakers, appliances, locks, plugs, security systems, pet feeders, cameras, music players, media streaming devices, virtual assistants, and other such technologies. In some embodiments, users can access a control interface for a specific smart device in the physical space through the network connection. For example, users may be able to select which devices in the spectrum of available devices can be used to collect sensor data for the system 250.

Furthermore, the term 'task' in this specification relates to the nature of an activity on which time is spent by a child or other end-user that may or may not be towards achieving some assigned objective. The list of tasks can be determined by the supervisor (e.g., parent) who has authorized the task reward and manager service, accessible for example via a task manager app running on the client device 282. For instance, a task or activity type, can include (but is not limited to) online activities such as homework which may be classified in different categories related to the course in which the homework is assigned, such as history, social studies, science, math, English, art, health, music, economics, physical education, etc., and chores for the home which may be classified in different categories related to the chore such as washing dishes, laundry, clean room, set table, vacuum "ABC" room, sweep, dust, clean bathroom, clean litter boxes, walk animal (e.g., pets), feed animal, bathe animal, read, pick up sibling from some location, drive sibling to some location, make dinner, mow lawn, practice basketball or other sport, exercising, rake leaves, practice musical instrument, practice singing, practice/rehearse speech or presentation, etc. In some embodiments, the parent can also label the location that is associated with each chore, and/or the specific sensor device that is nearest to the site of the chore to be performed. This can be used by the system to activate a monitoring/recording operation at the designated sensor device and detect whether the chore is performed. Thus, if wash dishes is selected by the child (a chore linked to the site: kitchen), a sensor device (e.g., motion, video, image, thermal, moisture, etc.) located in the kitchen can switch on until the child indicates the task is complete. The sensor data from that specific device can then be used by the system to determine whether the task was actually performed. It can be appreciated that these tasks are for purposes of illustration only, and additional or alternate tasks may also be created and defined by the parent.

In some embodiments, the task definition can include data regarding the task to be performed, a deadline in which the task performed, a method or indicator associated with the task being completed, and the like. For instance, the task data may indicate that the trash should be taken for collection two times in the upcoming week. The task data may also indicate that the task may be verified by way of an image data (or other data) received via an image sensor that is part of the system, the sensors that may be positioned within a sensing proximity of the trash collection site, or the like. In some embodiments, the sensors may activate and acquire data (e.g., initiate a monitoring session) when a person has indicated the start of a task via the child app. Once the child indicates they have completed the task (e.g., via the app), the system can responsively deactivate the sensor device or otherwise terminate the monitoring session so that sensor usage is limited to only specific times, conserving power and protecting privacy.

Figure 3:
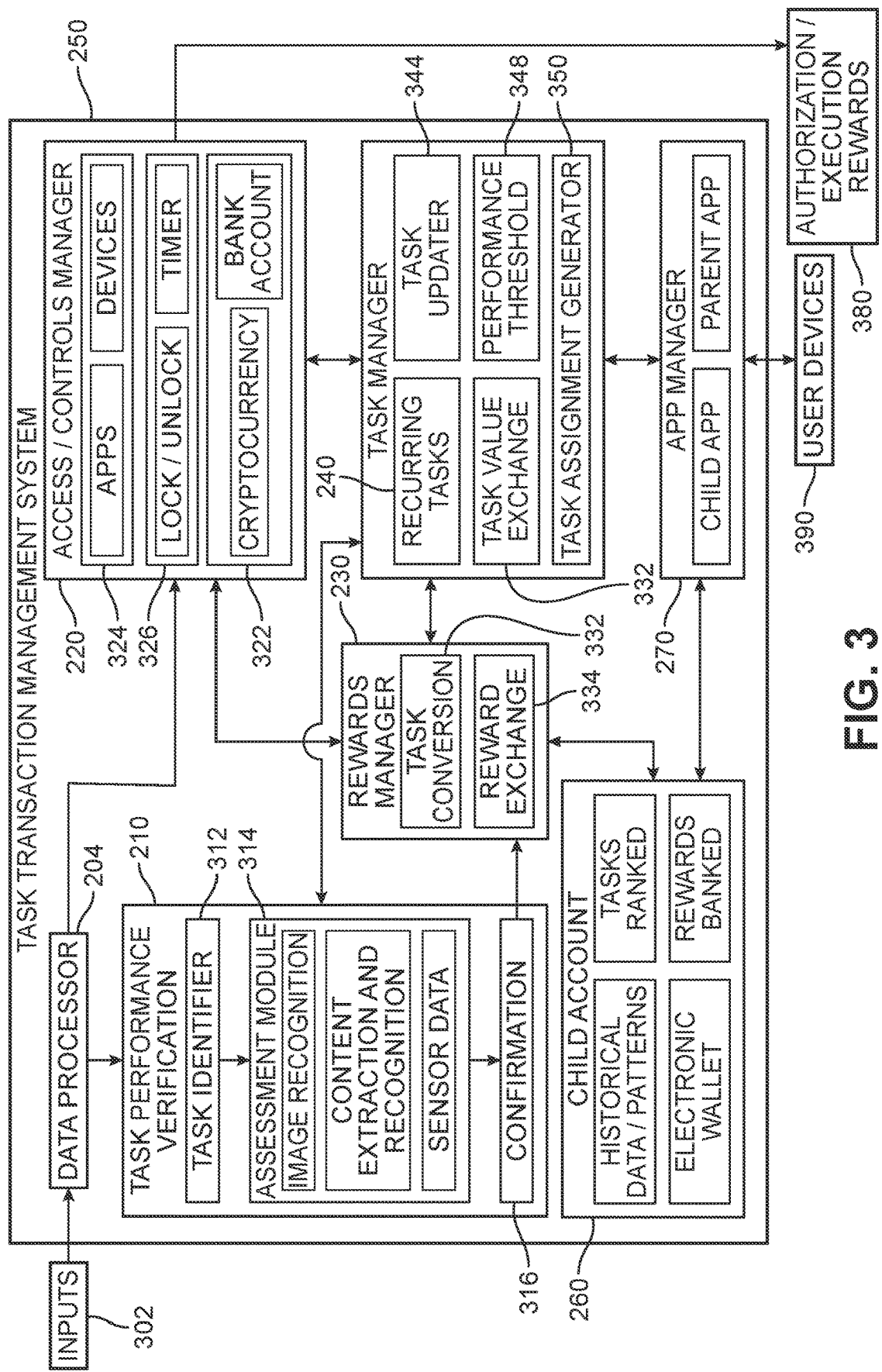
FIG. 3 is a schematic diagram of a task transaction system, according to an embodiment.
Figure 4:
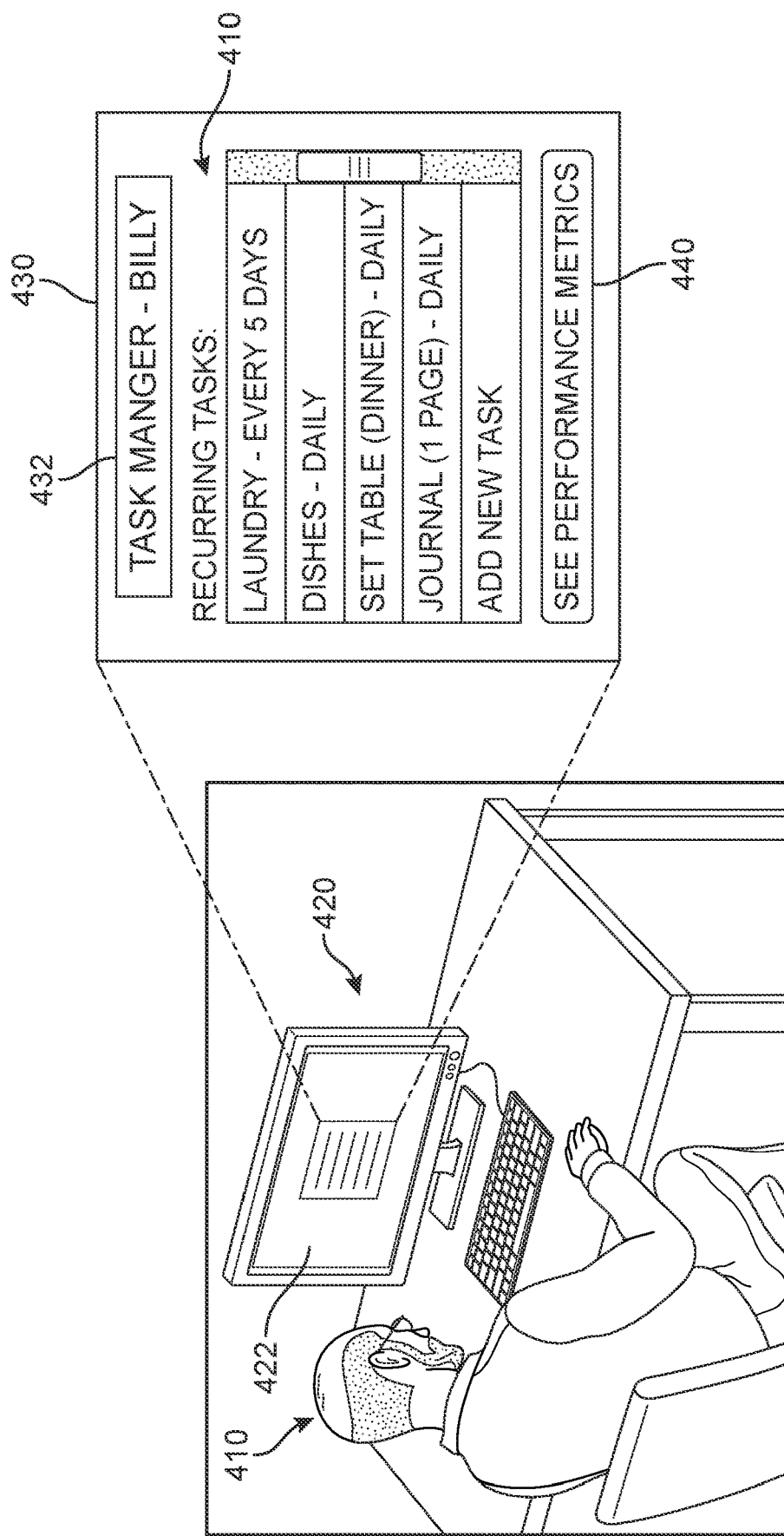
FIGS. 4 and 5 are examples of an authorized end-user such as a parent managing a task and reward program for their child, according to an embodiment.
Figure 5:
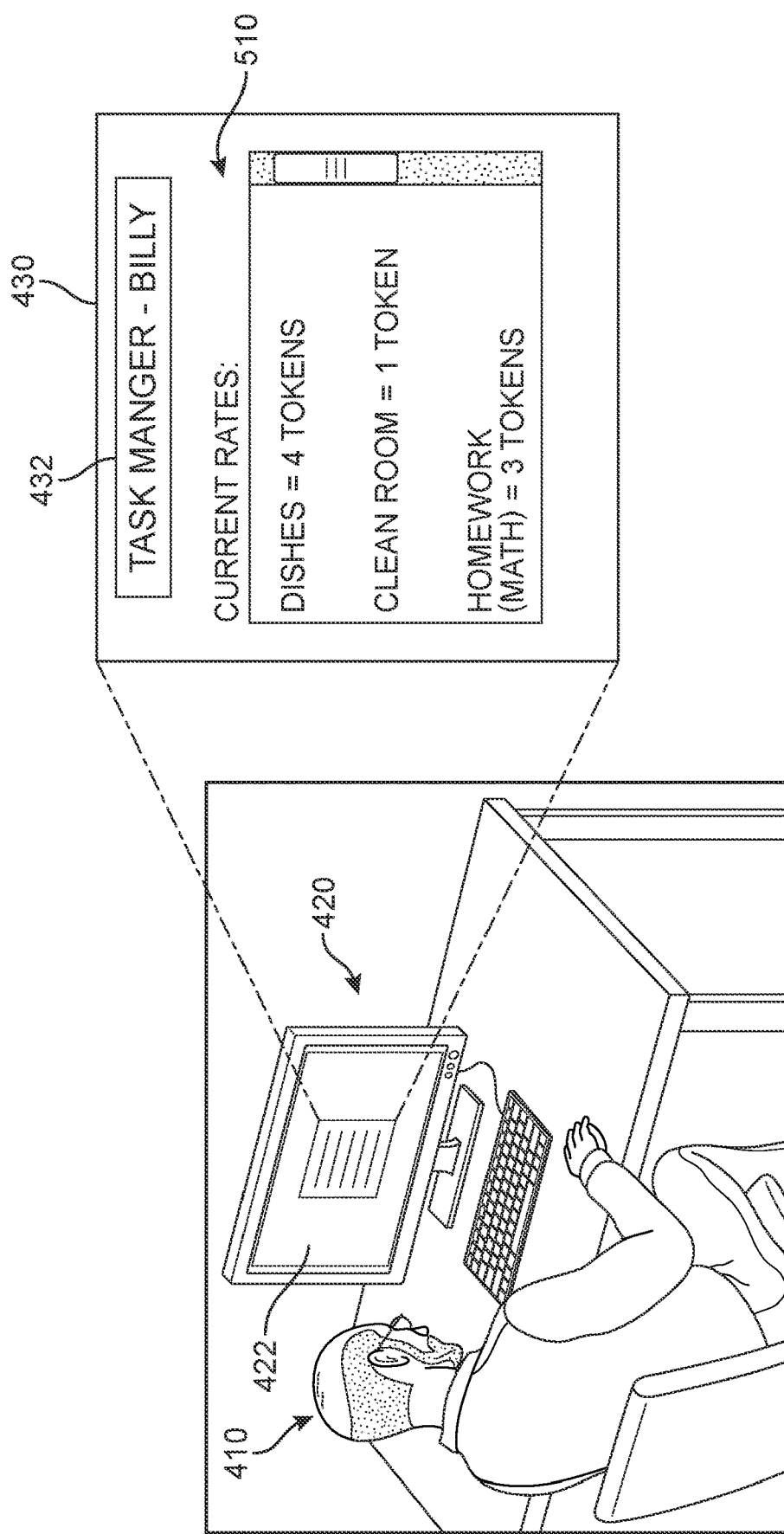

In different embodiments, the system 250 can provide an authorized supervisor (e.g., parent or other adult) with various options by which the tasks and rewards can be designated (e.g., see FIGS. 4 and 5). In some embodiments, these options are provided via the task manager app. In different embodiments, the task manager app can be in communication with at least an app manager 270 and a task manager 240 of system 250. As shown in the expanded view of system 250 in FIG. 3, the task manager 240 can include a task creation/updater module 344, a recurring tasks designator 342, a task value exchange dictionary 346, a performance threshold modulator 348, and a task assignment generator 350. In different embodiments, the parent can engage with the features of the task manager 240 via services of the app manager 270 to initially select one or more default tasks that may be defined by the system 250 via task creation/updater module 344, such as homework or other tasks. The task creation/updater module 344 is configured to permit the parent to identify a task, define the task, including what constitutes a completion of the task. In addition, recurring tasks designator 342 allows the parent to identify whether any task is to be performed with some frequency (rather than one-time), and in some embodiments, the recurring tasks designator 342 can be used to indicate that full performance of a task (that will lead to a reward) requires the completion of the task on multiple occasions (e.g., wash dishes every night over one week) before tokens will be provided to the child. In other words, recurring tasks designator 342 allows the parent to create a task that must be repeated over one day, or over some number of days, weeks, months, etc. before the accompanying reward can be generated by the system 240.

Furthermore, the system 250 allows the parent to make use of default terms in task value exchange dictionary 346, as well as create new terms. The task value exchange dictionary 346 describes relationships between a given task and a reward. In other words, for each task, a specific token quantity is defined. For example, a first task (e.g., washing dishes) can be listed as having a default value of 3 tokens. However, the parent can adjust the quantity whenever desired. In addition, the number of tokens can be linked to the day of the week or even time of day. For example, such that washing dishes on the weekend (when there are many dishes in the sink) is worth more than washing dishes during the weekdays when no one is home and only a few dishes are in the sink. In another example, washing dishes in the morning is worth more than washing dishes in the evening because there is less time available to the child in the morning. These adjustable scales can be used by the parent to personalize the incentivization provided by the system. Furthermore, in some embodiments, the tokens that are to be provided following some types of chores can be pre-tagged to limit their use by the child. In one example, the parent can designate tokens that are generated following completion of homework be usable only for video games, while tokens that are generated following completion of household chores be usable only for purchases of toys. The system can then automatically associate these limitations to the tokens to ensure they will not be applied to undesirable reward activity by the child.

In different embodiments, the performance threshold modulator 348 is configured to present options to a parent for changing what constitutes a sufficient level of task completion for purposes of meting out a reward to the child. For example, the performance threshold modulator 348 can receive a description, selection, or image data that illustrates what the completion of a task looks like. In some embodiments, the parent can submit a photo of a clean sink and/or an empty dishwasher from their kitchen. These reference image(s) (also referred to herein as verification images) are stored by the performance threshold modulator 348 as a standard by which a task performance verification module 210 will determine task completion. In another example, a selection can be made by the parent that (e.g., for homework) the child must present a blank page of questions and then a filled out/completed set of answers on the same page (with a timestamp after the timestamp for the blank page), suffices as proof of this task being completed. In other embodiments, the parent can request that the system 250 apply natural language processing (NLP) techniques to determine if the writing represents a good faith effort to complete the homework (e.g., see FIGS. 9 and 10), e.g., by determining if a page of questions has been filled, if a prompt has been responded to (essays), a drawing has been made (art class or other freeform questions), or other such evidence of effort can be detected by the system 250.

Returning to FIG. 2, in different embodiments, the child user can, via child device 290, access a task reward app 292 associated with the system 250. In some embodiments, the task reward app 292 is a program that is downloaded and resides on the local device (as depicted in the example of FIG. 2), while in other embodiments, the task reward app 292 is web- or cloud-based, residing alongside app manager 270, and accessible via the child device 290 over a network connection. The task reward app 292 can provide a user interface from which the child can access various features and settings. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In one example, a child can, via task reward app 292, select one or more options to interact with the system 250. In some embodiments, the task reward app 292 can include one or more of a task list module ("task list") 296, a task selector module 298, a reward selector module 206, a rewards balance module 208, a task submission module 286, a task performance sensor data module 288, and a task calendar module 278, among other features. In one embodiment, the task list module 296 can provide features by which the child can review the list of tasks and filter them by their preferred style, such as viewing tasks by time (e.g., view tasks for the morning/before lunch, tasks for the afternoon/after lunch-before dinner, tasks for the evening/after dinner, or hour by hour, etc.), viewing tasks by type (e.g., household chores, homework, driving-based, etc.), viewing tasks by reward value (e.g., tasks offering the most quantity of tokens to tasks offering the least quantity of tokens), which can allow the child to more intelligently select (via task selector module 298) a task while developing time management skills and help them balance their motivations for rewards with their desire to perform said task (i.e., an 'easy' task may have fewer tokens but is more desirable/attractive for the child to complete, while a 'hard' task may have greater tokens but is less desirable/attractive for the child). In some embodiments, these filters can be combined. For example, the child can view all tasks for only the morning in order of their reward token quantity.

Similarly, in some embodiments, the task reward app 292 can allow the child to 'plan ahead' and view the tasks via a task calendar module 278 that can present a day-by-day, week-by-week, or month-by-month view of their upcoming tasks. These can include regularly recurring tasks as defined by the parent. Such a feature can be used by the child to develop a strategy for reaching a goal. For example, if a child wants to purchase a new video game that costs X dollars, and the exchange rate per their parent's policies is one token is a half-dollar, they understand they need 2(X) tokens. The child can review the task calendar and identify the tasks they might perform and how many days or weeks etc. that are required before the target token quantity is attained. This approach fosters a work-ethic in the child of patience and investment in a future larger prize.

In different embodiments, once a child selects, via task selector module 298, a task from the task list 296, depending on the type of task, the system 250 can include provisions for monitoring and/or verifying the performance of the task. In some embodiments, the system 250 initiates a monitoring or capture of data via one or more sensors (e.g., sensor devices in household and/or onboard sensors of the child device) only after a task has been selected. Furthermore, the type of sensor data that is recorded, or the location of the sensor that is used to monitor the child's activity (e.g., bedroom, living room, kitchen, etc.) can be automatically selected by the system 250 based on the task selected. For example, if the child selects wash dishes, the sensor in the kitchen detecting whether the faucet in the kitchen sink has been turned on can be activated. For example, the child device 290 can include onboard sensors 294 (e.g., camera and/or microphone) that can be used to collect data. In one embodiment, the system 250 can, in response to the child's selection of a particular task, request some initial input (pre-performance) from the child that describes the current condition of the physical space/object associated with performance of the selected task, based on the definition submitted by the parent, which will be passed to the task performance verification module 210 via task submission module 286. As some non-limiting examples, if the child selects 'wash dishes', the system can request a photo of the sink and/or dishwasher in its current state (i.e., to show that there are dishes to clean or be emptied); if the child selects 'math homework', the system can request a photo of the blank math worksheet (i.e., to show the work to be completed); if the child selects 'pick up sister from ballet', the system can request a photo of the vehicle as the child leaves the house; if the child selects 'vacuum', the system can request a photo of the carpet before cleaning; if the child selects 'set table' the system can request a photo of the dining table before it is set. For each of these image-based inputs, metadata can also be generated by the image sensor device (e.g., integrated in the child's device) that will be collected by the system 250 for evaluation by the task performance verification module 210.

In different embodiments, the task reward app 292 can present a selectable option by which the child can indicate he/she has successfully completed the selected task. In response to this selection, the system 250 can request a post-performance input by the child via task submission module 286. Based on the above examples, the follow-up input can include an image of an empty sink or dishwasher, or the dishwasher with the light on (being run), an image of a completed math worksheet, an image of their sister in the passenger seat of the vehicle, an image of the carpet after cleaning, an image of the dining table set and ready for dinner, etc. Again, for each of these image-based inputs, metadata can also be generated by the image sensor device (e.g., integrated in the child's device) that will be collected by the system 250 for evaluation by the task performance verification module 210.

In some embodiments, other task-related sensor data can be collected, for example via task performance sensor data module 288, including location data. Such data can be obtained via a positioning sensor integrated in the child's device (e.g., GPS) and/or via sensors in the household that can identify where the child is at a particular time, particularly in cases where the child is known to submit inauthentic data to try to 'trick' the system and obtain tokens. Sensors can include, for example, a positional sensor configured and operational to record the position of the unit. For example, the positional sensor may be, or may comprise, a Global Positioning System (GPS) receiver, or a local positioning system (LPS) or indoor positioning system (IPS), which may allow the position of sensor or device to be determined, and/or their position relative to a specific room or space in the house, and/or their position relative to the child's location. As another example, positional sensor may use triangulation technology that communicates with fixed points (such as wireless communication towers) to determine its position. In one embodiment, one or more of the devices may include an RFID tag or GPS signal to generate location information for use by the system, or other receivers capable of receiving global or local positioning information. In some embodiments, additional sensor data can include sound data from microphones, for example where the task involves vacuuming (e.g., detecting the sound of the vacuum in the correct location), practicing a musical instrument (e.g., detecting the sound of the instrument being played), or other audio that is related to the designated task.

In still other embodiments, on-site sensor devices arranged in the house or other pertinent area can be used to detect/monitor and collect performance data. For example, the environment 200 (see FIG. 2) can include sensor devices 280 that may be utilized to monitor the child's activity if the child has indicated that he or she will be completing a particular task in a particular location, such as at home, e.g., in his/her bedroom, kitchen, living room, bathroom, dining room, patio, study, basement, rec room, master bedroom, etc. One or more smart devices with onboard sensors may be stationed in these areas, and include various components (e.g., a communication module, a computing device, a controller, a battery, and/or an array of sensors). In some examples, the device sensors can include a camera for capturing images and other light-based data for receipt by the image processing system. Camera may comprise any kind of camera, including any kind of digital camera, as well as a camera configured to capture infrared, x-ray, ultraviolet, and visible light signals. Other examples of sensor devices include, but are not limited to, cameras, infrared sensing devices, moisture sensing device, motion sensing devices, sound sensing devices, gas sensing devices, material sensing devices, x-ray, thermal sensing devices, and the like. Some other non-limiting examples of such sensors include, but are not limited to, image sensors, microphone or other audio sensors, capacitive sensors, motion sensors, heat sensors, location/positioning data, time-of-flight (TOF) sensors, and/or ultrasonic sensors.

Based on the type of input received by a particular sensor, the system 250 can determine whether the task is being performed and/or has been performed successfully. In one example, if the child indicates they will be practicing their instrument in the living room, a sound sensor (e.g., microphone) of a smart device in the living room can monitor the space for sounds of the instrument being played for the requisite amount of time. In other examples, if the child indicates they will be exercising by playing basketball, a sensor device in the front yard by the basketball hoop can be activated to monitor the sound of a ball being bounced, or a motion detector installed on the hoop pole can receive data indicating the child's proximity for the requisite period of time. In some embodiments, if the child indicates they will vacuum in the dining room, an infrared sensor can be used to more accurately detect whether the dirt in the space has been removed. In one case, a child indicates they will walk the dog, a location sensor on the pet's collar can be monitored to determine whether the dog traveled the requisite distance. In another example, if a child indicates they will wash the bathtub, a moisture sensor in the bathroom can be used to monitor whether there is a sufficient increase in moisture while the task was performed.

In some embodiments, the sensor devices 280 may include any suitable wearable smart device that may track movement of a user, send data to other network-connected devices, and the like. In some embodiments, the location of a wearable device may be provided to the system 250 to enable the system 250 to determine areas or locations that the user wearing the wearable device may have visited. In some embodiments, the data provided by the wearable device may provide the system 250 with insight into whether the user performed a task. Indeed, the task may be associated with an exercise goal (e.g., minutes of exercise, number of steps) that may be tracked by the wearable device, which may forward the relevant data to the system 250. Sensor devices 280 may include other suitable electronic devices that may be used to verify that tasks are performed. For example, the sensor devices 280 may include motion or proximity sensors that log activity of the user in a particular area.

In addition to the components described above, the environment 200 may include one or more sensors that may track the user's presence or activities. The sensors may include image sensors that track or record video data or image data of the user's activity. The sensors may also include infrared sensors or other suitable sensors that may be used to receive data representative of a state of a physical space or object. As such, the data received from the sensors may be utilized by the system 250 to determine whether tasks are performed, such that the system 250 may take additional actions as described herein.

In addition, the child devices 290 may include devices such as tablet computers, headphones, routers, gaming systems, and other devices that may be controlled via wired or wireless communications. In this way, the system 250 may control access or the functionality of the electronic devices in accordance with embodiments presented herein. A computing device may include any suitable computing device, such as a general-purpose computer, a smart phone, a tablet device, and the like. The computing device may include any suitable computing device such as a general-purpose computer, a mobile-computing device, a tablet-computing device, a laptop-computing device, or the like. In certain embodiments, the system 250 may receive data from the various sources illustrated in FIG. 2 to perform the various embodiments described herein.

As noted earlier, in different embodiments, the system 250 includes provisions for verifying the performance of a task. In FIG. 3, it can be seen that task-related inputs 302 can be received from sensor device 280 and/or child device 290 over networks 212 for ingestion by a data processor 204 of the system 250. In some embodiments, as incoming content is received by the system 250, it can be filtered and preprocessed by the data processor 204. For example, in cases where image data including text is submitted (e.g., for homework-related tasks), or even a computer file (e.g., .doc, .word, .txt, .ppt., .pdf, etc.) various natural language processing and content/sentiment analysis on the content (e.g., a journal entry, an essay, or a worksheet) can be performed.

The processed data can then be received by the task performance verification module 210. An initial step can include identification of the task by a task identifier 312, for example by reference to the task selection submitted by the child. This, along with the received sensor data, can be received by an assessment module 314. The assessment module 314 can perform various analysis to detect pertinent information in the sensor data. In one example, an analysis using a series of natural language processing (NLP) steps can identify the context, sentiment, inappropriate words, or phrases, etc. In some other embodiments, the assessment module 314 can convert audio or other spoken information to text via speech processing systems. In different embodiments, data processing can include any suitable technique for optical character recognition (OCR), optical word recognition (OWR), intelligent character recognition (ICR), intelligent word recognition (IWR), natural language processing (NLP), machine learning, parsing, and/or other techniques for identifying particular text elements or other data elements in the text.

In one example, the assessment module 314 can perform context extraction and recognition. For example, the system 250 can perform natural language processing on the incoming data to interpret the language, for example by parsing sentences, and determining underlying meanings of the text. Embodiments can make use of any techniques already known in the field of natural language processing (NLP). These include any techniques in speech recognition and natural language understanding. As one non-limiting example, in cases where an audio file is submitted (e.g., the child is rehearsing lines from a play, or a speech for their class, or is supposed to practice public speaking), the system 250 can include the computing resources to conduct natural language processing (NLP) on received speech audio files. For example, the NLP applied by the system 250 may include machine translation of the received speech audio files to obtain a translation of the speech captured by the received speech audio files into written text. The machine translated text may then be analyzed according to one or more NLP analyses such as text summarization and/or sentiment analysis. The NLP analyses may comprise implementing sentence breaking rules on the machine translated text to break up the text into smaller chunks of text such as paragraphs and individual sentences. The NLP analyses may further comprise tagging parts of speech identifiers (e.g., noun, verb, article, adjective) to the words that comprise a chunk of text. The NLP analyses may further comprise parsing the text to create one or more parsing tree that outline different possible interpretations for a chunk of text. The NLP analyses may further comprise terminology extraction that extracts one or more key terms from a chunk of text to better understand the context of the text. The NLP analyses may further comprise language translation capabilities to translate text from one language to another. Based on the definition of the task (what constitutes completion) provided by the parent, and the task identification, the assessment module 314 can determine whether the text that is submitted should represent or correspond to a performance of the task.

In some embodiments, machine vision, image recognition, and/or related analysis can be used to assess nonverbal/non-textual elements of source data (image content), such as the condition of a room or appliance or for purposes of object recognition and matching. In some embodiments, in cases where such data includes images or video, the assessment module 314 can implement an image recognition module. Image recognition module may, for example, apply a convolutional neural network. In another example, computer learning may be used to recognize image elements such as faces, words, body parts, graphic features, etc. For example, an assessment module 314 can execute an object recognition protocol to identify one or more image features of the image content and then determine an identification of the object(s) in the image content based upon the one or more features of the digital image identified by the executed object recognition protocol. Based on the definition of the task (what constitutes completion) provided by the parent, and the task identification, the assessment module 314 can determine whether the image that is submitted should represent or correspond to a performance of the task. In one example, the submitted post-performance image can be compared to a reference image for the given task that was previously provided by the parent. If the two images match to a degree that exceeds a performance threshold 348 as designated by the parent or preset by the system 250 as a default standard, the assessment module 314 can deem the task performance verified. In cases where the task is clearly visible when performed (room is clean when all toys are removed from floor, dishes done when sink is empty, etc.) the performance threshold may be higher. However, in cases where the task is less clear, such as vacuuming of a carpet (i.e., the dirt on a carpet may not always be visible in the image) the performance threshold can be lower to accommodate the ambiguity.

In different embodiments, the child would be instructed as to what the completed task condition looks like in order to emulate it, either by a text-based description, or by presenting the reference image to the child so that they know the condition/appearance they should target. In some optional embodiments, the initial input by the child (before task performance) can be used to show that the task was not 'already done' shortly before—in other words, if there are no dishes in the sink because the child used paper plates, the before image would show no dishes, and this would block the generation of a reward.

In some instances, the comparison may result in a confidence metric or a measure of similarity between the parent-provided data and the child-submitted data. For example, the child's image may be compared to the retrieved verification image using an image comparison algorithm to determine a degree of similarity between the two images (e.g., 80% similar). The similarity metric may be returned in the response as a confidence metric indicating how confident the system is that the task has been performed satisfactorily. Alternatively, the system may output a binary, yes/no response that is determined based on comparing the similarity metric to a predetermined threshold. For example, a similarity measure of at least 75% may lead to a determination that the task is verified (e.g., a yes answer), whereas a similarity measure below that threshold may lead to a determination that the task is not verified (e.g., a no answer).

In some embodiments, the assessment module 314 can generate an object profile of one or more detected objects based upon one or more data records of the object stored in the task manager 240 by the parent for that task, where each respective record contains data corresponding to a valuation of the respective objects. In other words, object tokens can be processed to generate a value corresponding to the image data for that object. In one embodiment, the object profile also stores member identifier data associated with the user who submitted the image content. If subsequent image data includes a substantially similar valuation, it can be determined that a match has occurred. It is important for subsequent declarations of task completion relying on the selected object token (e.g., a clean/empty sink, empty laundry hamper, clothes hung on rack, etc.) to present or capture the object token in the same or substantially similar pose in order to ensure the value for the received object token is as close as possible to the original stored object token value (the clean sink image as submitted by the parent for reference). In other words, in some embodiments, the received object token value is compared by assessment module 314 with the stored object token value ("verification value"), and if a match is found or is in an acceptable range, a confirmation 316 can be generated that enables rewards manager 230 to convert the task performed to the designated quantity of tokens (via a task conversion module 332). If there is insufficient basis for a match, the system 250 can indicate to the child that the task cannot be verified at this time, and they can re-submit the sensor data if they wish (e.g., after trying to complete the task again) and in some cases present encouraging feedback such as "You're almost there!" or "How about putting a little more time into this?", for example, based on defaults of the system 250, or as selected/manually entered by the parent.

In still other embodiments, the submitted image purporting to represent the completed task can be compared to the parent-submitted verification image, and the system 250 can determine a degree of correspondence or lack of correspondence between the images. As another example, the submitted image may be converted to a hash of the image, generated by the system 250 using the same hashing algorithm that is used to generate a hashed version of the verification image. In such cases, the presented hash may be compared to the stored hash, and the system 250 can indicate whether they indicate a match that is above a match threshold.

In some embodiments, assessment module 314 can also include components and/or features that offer additional layers of verification. For example, as noted earlier, sensor location data can be submitted to augment image or other primary verification data. In such cases, the assessment module 314 can determine whether the child's current location matches the expected location of the child for performance of the identified task. In addition, metadata such as a time/date at which the sensor data was obtained can be used to ensure 'old' sensor data is not being submitted (e.g., a clean sink from yesterday). In some embodiments, the assessment module 314 can, in response to a discrepancy in the timestamp of an image, place a hold on the verification and notify the parent to follow-up. Discrepancies can include a time/date that is prior to the time at which the initial input (pre-performance) was received, or a time/date that is prior to the selection of the task from the task list.

Once a task has been completed and verified, the task performance verification module 210 can generate and transmit confirmation 316 to the rewards manager 230. In response to the confirmation signal, the rewards manager 230 can grant the number of tokens assigned to this task (based on the task value exchange dictionary 346). The tokens can then be added to child account 260, for example in an electronic wallet. In different embodiments, the child account 260 can also serve as a repository of the child's activities, such as past activities (e.g., historical data/patterns), a dynamic listing of the child's preferred/most frequently chosen tasks/chores (e.g., tasks ranked), a dynamic listing of the child's preferred/most frequently chosen rewards (e.g., rewards ranked). This and other information can then be shared by the system 250 with registered user devices 390 (e.g., parent devices and child devices), for example through the parent app via the app manager 270.

In different embodiments, the parent/authorized user of system 250 can pre-establish access to one or more reward exchanges. For purposes of this application, a reward exchange refers to the use of tokens to 'purchase' a reward. In different embodiments, the child can access their child account 260 and review the amount of tokens in their electronic wallet. They can then access a user interface associated with a reward exchange module 334 that can indicate the items/services/currency that can be obtained using the tokens. In some embodiments, the parent may have pre-authorized an access/controls manager 220 of system 250 access to one or more controls that can be used by the system to automatically cause the tokens to be exchanged for a desired reward. In one example, the parent can authorize use of a private key of the parent to automatically sign a transaction that uses a currency of the parent to pay for the requested item. For example, the parent's private key could sign for a transfer of dollars or bitcoin to pay for the in-game currency that the child has earned using tokens. Thus, the system allows for a child to earn tokens with no inherent value. The system allows a parent to lend value to the tokens to by authenticating a transaction that causes the parent's resources to provide real-world value to the child's tokens. For example, the system can be authorized to digitally sign for a transaction in which a proprietary token of the system (with no inherent value) acts as proof of certain behaviors in the real world. The tokens can be transformed into a currency or another entity having real-world value by using a particular type of automated transaction based on using a parent's private key to access parental resources or otherwise validating electronic transactions, thereby lending real-world value to the electronic token-currency.

In one example, the private key is created based on the parent's information authorizing access to funds 322 (e.g., cryptocurrency, bank account, etc.) stored in access/controls manager 220. In another example, online retailer login and purchase (credit/debit/gift card) details can be stored to allow the system to facilitate the exchange of tokens for purchase of some item from the selected retailer without requiring parental input. In yet another embodiment, cryptographic techniques such as private-public key techniques (e.g., Pretty Good Privacy (PGP) encryption) may be used to store the access details for funds 322. For example, certain entities, including banks and online retailers, may share their public keys. The public keys in combination with a private key (e.g., private key held by the system 250 on behalf of the client) may then be used to encrypt and de-encrypt the information in order to perform the exchange. In some cases, the system 250 can encrypt some or all of the information associated with the parent, such that only authorized parties can access that information. For example, the system 250 can encrypt the account identifiers and/or merchant identifiers, such that only the merchant or the financial institution can access that information when a transaction is to occur. In some cases, the system 250 can encrypt information using public-key cryptography.

Some techniques, features, components, modules, and other aspects by which authorization of an electronic transaction can be performed on behalf of a child using the parent's automated clearing house (ACH) funds, blockchains, cryptocurrency, bank accounts, and the like are described in "ACH authorization validation using public blockchains" to Vijayvergia et al., U.S. Pat. No. 11,188,907, granted Nov. 30, 2021, as well as "Systems and methods for online payment transactions" to Hawes et al., U.S. Pat. No. 11,288,642, granted Mar. 29, 2022, and "Transaction management based on sensor data" to Smith, et al., U.S. Pat. No. 11,157,906, granted Oct. 26, 2021, the disclosures of which are incorporated by reference herein in their entirety.

In different embodiments, system 250 can also include verification information that demonstrates the access validity. In some cases, the system 250 can digitally sign off on a block (e.g., of a blockchain), such that system's identity is embedded in the block. If the block is altered after generation, the digital signature is invalidated. Thus, based on the digital signature of the block, recipients of the block can ascertain that the system generated the block, and whether the block has been altered after generation. In some other cases, the system 250 can include verification information generated using a proof of stake protocol.

In some embodiments, rather than exchange the tokens for funds 322, the child may be permitted to exchange tokens for activities, such as but not limited to time for (a) internet browsing, (b) video gaming, (c) watching/streaming media, (d) social media access, etc. For purposes of this application, the term "digital media" will encompass these and other electronically accessible media and products, including but not limited to ecommerce, games (console, online, mobile), websites, mobile apps, animation, social media, video, e-book, audiobook, music, magazines, newspapers, journals, articles, audio file, podcast, augmented reality, virtual reality, data visualization, interactive storytelling, or any other content or information shared through a digital device or screen. The social media platforms may include but not limited to YouTube®, Facebook®, Instagram®, WhatsApp®, etc.

In one example, apps and/or local computing devices that provide access to such content (portals 324) can be regulated and/or monitored by the stored access/controls manager 220. In addition, access to these portals can be managed or restricted based on time and/or an unlock/lock operation (access controls 326). Thus, in some embodiments, the child can request access to media or devices using a pre-specified number of tokens, a number that can be defined by the parent. In some embodiments, the parent can assign a token quantity to each device (or a single app, or internet access) unlock operation per day, where the device automatically reverts to a locked state at a certain time that night. In another example, the parent can assign a token quantity to each device (or a single app, or internet access) unlock operation per time period (e.g., half hour, hour, or other increment), and each time increment can be "purchased" with tokens. In yet another example, the parent can assign a token quantity that 'buys' access to the video gaming console for a period of time. In some embodiments, the parent can assign a token quantity that can allow the child to receive an automatic excuse for some chore that was to be done. Thus, the system 250 can, in response to a request by the child to spend tokens in their electronic wallet, trigger a reward exchange event (authorization/execution rewards 380) in which the tokens are used to provide access to external devices/apps/internet, etc. and/or the tokens are converted to some form of currency that has inherent value and can be applied to real-world purchases.

In some embodiments, the system 250 can determine that the assigned task is not complete, and—based on the parent settings—system 250 can proceed to block and send one or more signals to one or more of the child devices 290 to adjust respective operations of the child devices 290. For instance, the system 250 may send a signal to a tablet device that may cause the tablet device to disable applications from being accessed by the child. In another example, the system 250 may send a signal to a headphone set to disable usage for the child. In yet another embodiment, the system 250 may send a signal to any suitable electronic child device to disable any interaction by the user. In some embodiments, after determining that the assigned task was not completed, the system 250 may proceed to block access until the task is performed.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions.

Moving now to FIGS. 4 and 5, an illustration of a parent 410 interacting with an embodiment of a parent-task manager app ("parent app") 422 from a first computing device 420 is shown as an example implementation of the systems described herein. In FIG. 4, the parent app 422 provides access to an online dashboard 430 for each of the children that have been identified by the parent 410. In this case, a task manager interface 432 for a child "Billy" is accessed, and a list of recurring tasks 410 for Billy are shown. For purposes of this example, parent 410 can view tasks that he has created and, if so desired, select one for deletion or modification, or add/create a new task. For each task that is recurring, the time period selected by the parent 410 over which the task resets (to be repeated) is also indicated. In some embodiments, there may be one or more additional selectable options 420 for navigating to various features of the parent app 422, such as an option to view Billy's performance metrics (including those discussed with reference to FIGS. 2 and 3). In FIG. 5, the parent 410 switches to a different page of the parent app 422 to view a listing of current exchange rates 510 for each task. In some embodiments, each item on the list is selectable, and can be used to open an editable option for modifying the quantity of tokens that are assigned for completion of a particular task.

Figures 6A, 6B:
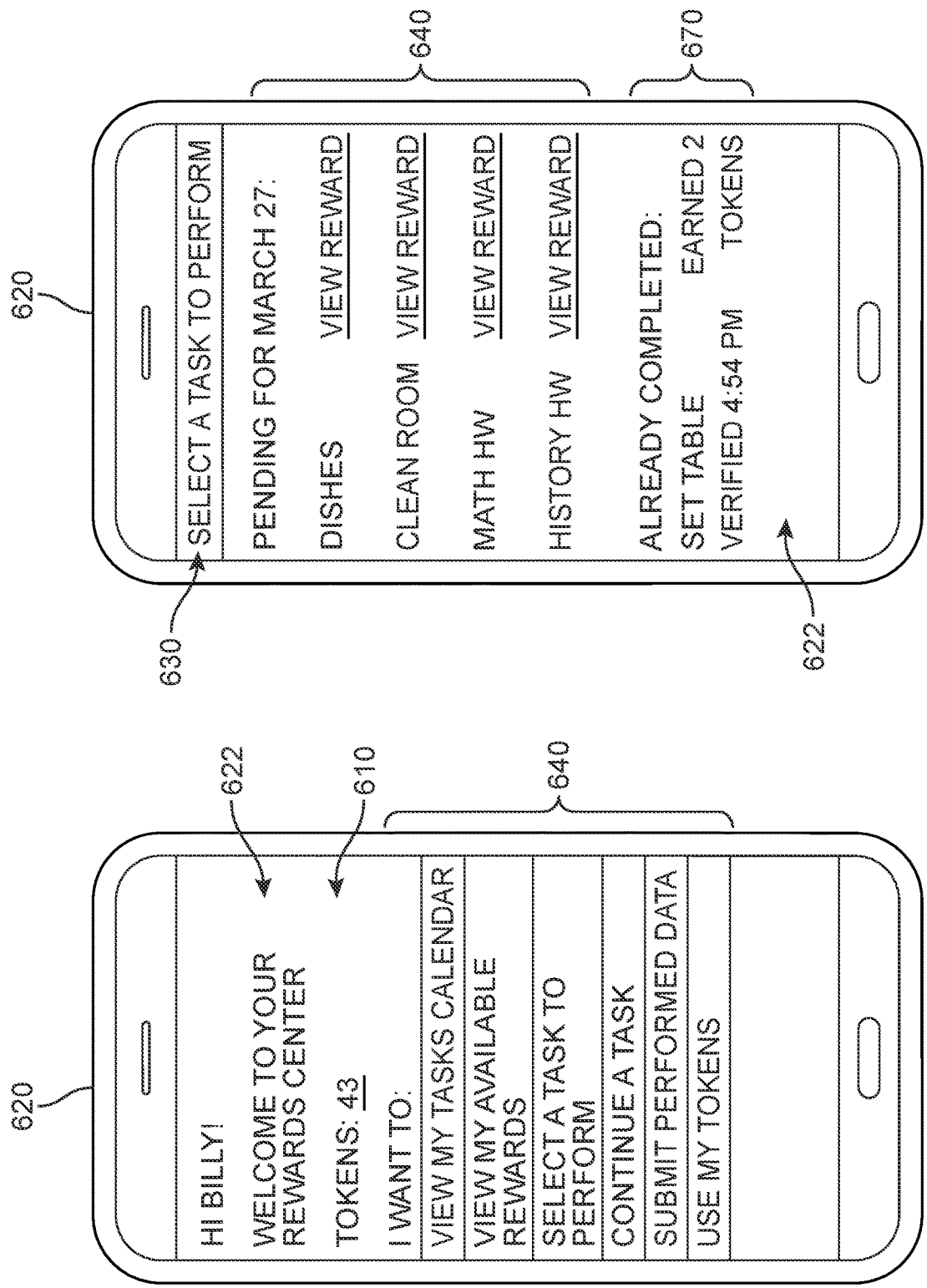
FIGS. 6A and 6B are examples of a user interface for an application by which a child can select tasks, according to an embodiment.

In FIGS. 6A and 6B, an illustration of an embodiment of a child-task reward app ("child app") 622 being accessed by a child (e.g., Billy) via a second computing device 620 is shown as an example implementation of the systems described herein. In some embodiments, as shown in FIG. 6A, as the child logs into the child app 622, they can access a home page 610, including a summary that can indicate how many tokens he currently has earned, as well as quick-access to one or more navigation options 640 (e.g., view my tasks calendar, view my available rewards, select a task to perform, continue an (incomplete) task, submit performed data, use my tokens, etc.). Moving to FIG. 6B, for purposes of this example, the child selects the third options (select a task to perform), and is presented with a task selection page 630. The task selection page 630 can present a first list 660 of those tasks that are currently available for the child to perform, with each item on the list being a selectable option that can initiate monitoring of the performance of that task. In some optional embodiments, a second list 670 can show tasks that have already been successfully verified and completed recently as well as the number of tokens earned.

Figure 7A:
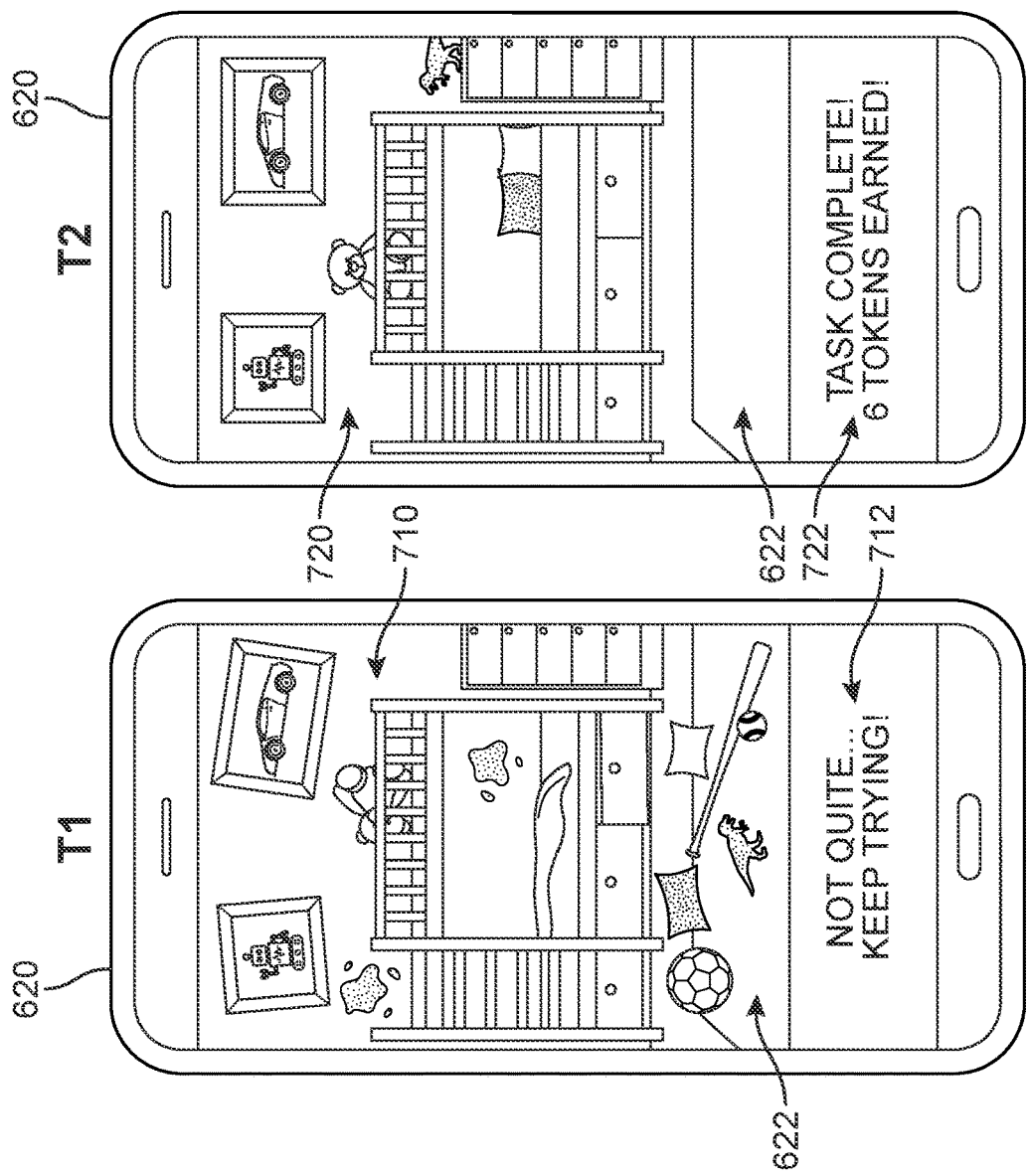
FIGS. 7A, 7B, and 7C are examples of a user interface for an application by which a child can submit data for verification using image comparison algorithms, according to an embodiment.
Figure 7B:
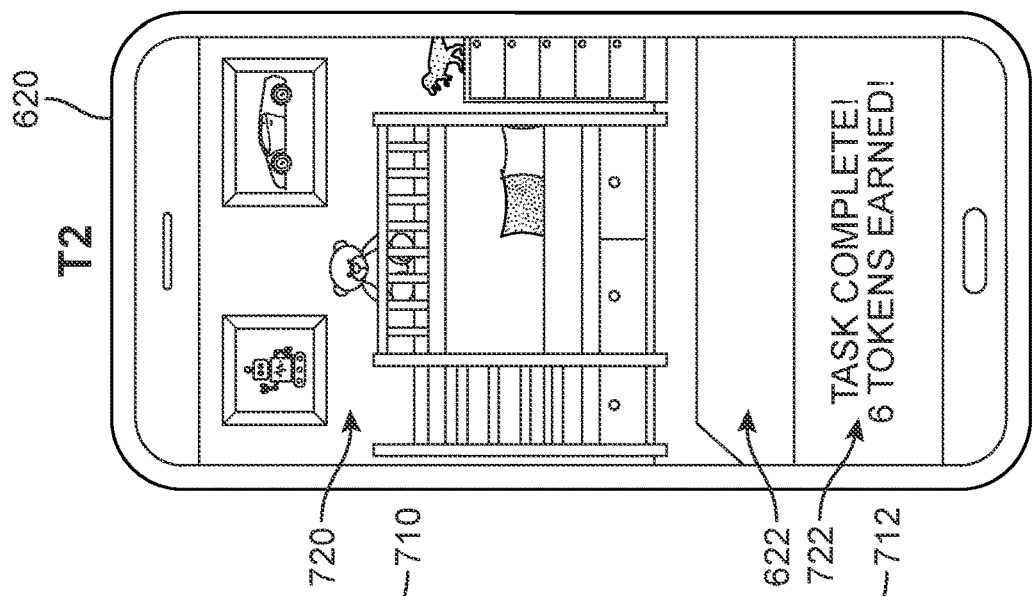
Figure 7C:
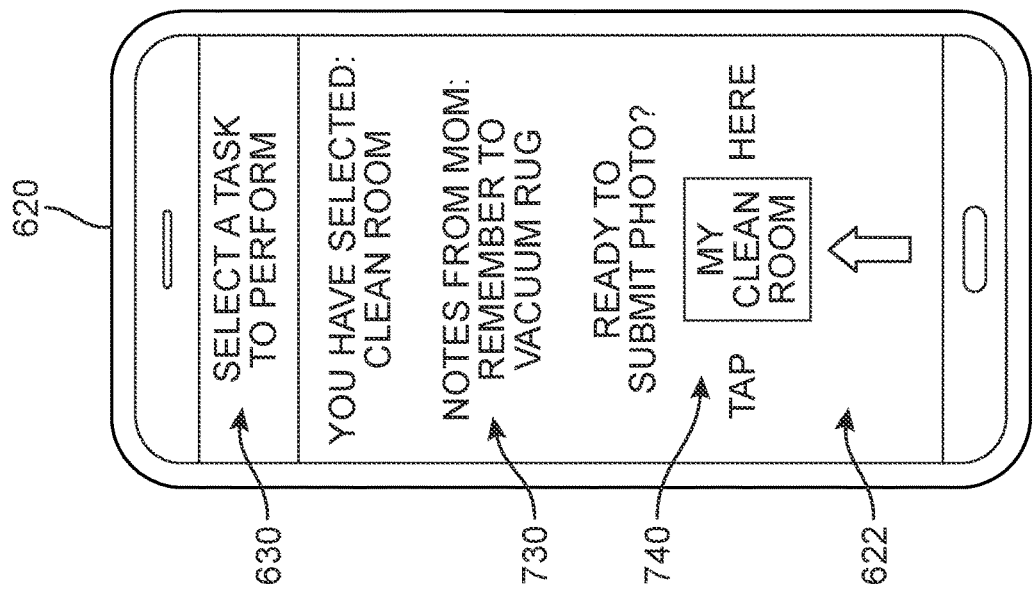

Referring now to FIGS. 7A-7C, a sequence of drawings illustrates a first example scenario in which a child uses the child app 622 to monitor and verify performance of a selected task. In FIG. 7A, the child has selected a task (clean room), optionally provided a pre-performance image, and is ready to clean their room. The task selection page 630 now shows their selection summary 730—including a note entered by the parent reminding them of a task-specific issue or concern that should be considered. When the child decides they have completed the task, they can submit an image (e.g., captured by a camera of the second computing device 620) of their work via a submission portal 740. In FIG. 7B, it can be seen that a first image 710 has been captured and submitted at a first time T1 to the task performance verification module, which can compare the first image 710 to a verification image of the same room that the parent has verified as representing the target/desired condition, and that was previously stored on the system. If the system determines two images correspond (e.g., within a threshold level of statistical similarity in the image comparison), the task performance verification module may return a response to the child app 622 indicating that the task completion is verified. However, as shown in FIG. 7B, if the system determines the two images do not correspond (e.g., within a threshold level of statistical similarity in the image comparison), the task performance verification module may return a response to the child app 622 indicating that the task completion cannot be verified. In some embodiments, an additional motivational message 712 may also be shown to encourage the child to try again. Following the failed verification, the child may return to cleaning the room, and, as shown in FIG. 7C at a second time T2, re-submit evidence in the form of a second image 720. In this case, the task performance verification module determines the second image 720 and stored verification image have a sufficient correspondence and therefore the task can be verified. In some embodiments, a congratulatory message 722 can also be shown to bolster the child's sense of accomplishment, which may optionally indicate the number of tokens that have been earned.

Figure 8:
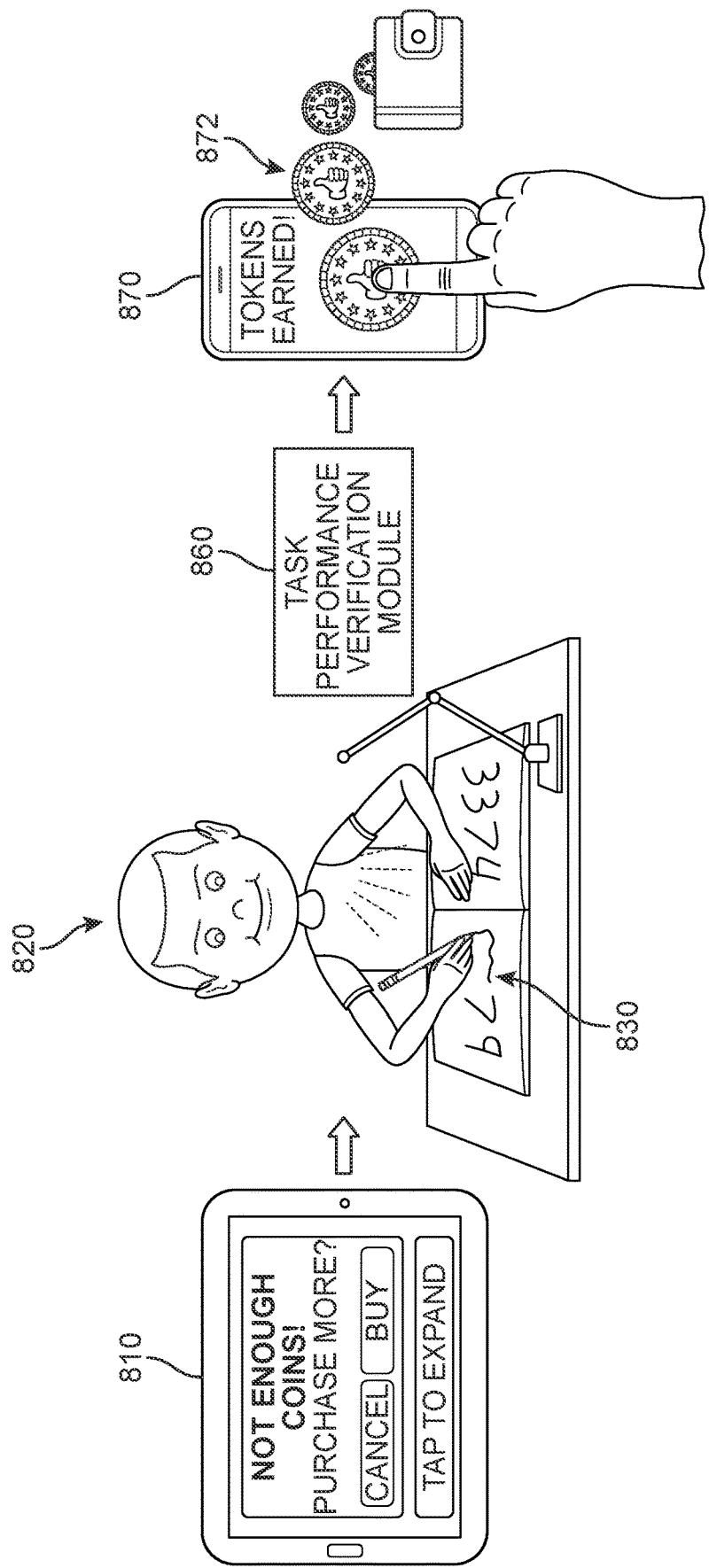
FIGS. 8 and 9 show a scenario in which a child performs a task that is verified using natural language processing techniques, according to an embodiment.
Figure 9:
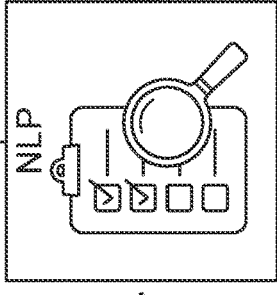

Referring now to FIGS. 8 and 9, a sequence of drawings illustrates a second example scenario in which a child uses a local on-site room/household sensor device 850 to monitor and verify performance of a selected task. In FIG. 8, a child 820 wishes to purchase in-app features in an app 810 they are playing. Realizing they do not have enough tokens, they log into their child app 870 and select a task that would provide sufficient rewards for them to purchase the feature. In response to selecting "math homework" as their task, a desktop sensor 850 is activated and begins to collect data from the desk in range of the sensor (camera field of view). The child 820 positions their math homework 830 (here shown as a workbook) in the target area, and image data can be recorded and transmitted over a network 852 to the task transaction management system for task verification. An example of the verification process for this task is depicted in FIG. 9 where a first input 910 showing the initial or starting condition of the worksheet for math homework 830 is fed to the system and processed, for example using various NLP techniques 950, as described above with respect to FIG. 2. Each set of questions on the worksheet can be detected by the system. At a later time, for example when the child indicates via their app that they have completed the assignment, a second input 920 can be received by the system and also processed with NLP techniques 950. Based on a comparison of the two outputs generated by the task performance verification module 860 with NLP showing that each section of the worksheet that had previously been blank now includes values or some response. It can be appreciated that while the task performance verification module 860 may not 'grade' or determine accuracy of the homework assignment, there is an evaluation of whether the child has made a good-faith effort to supply answers/responses to the questions. In some embodiments, only a majority of the questions, or some other percent of questions (e.g., 75%, 80%, etc.) need be answered, depending on the parent's selected threshold. Returning to FIG. 8, the task performance verification module 860 verifies the child's completion of the assignment, and the system can then trigger release of the designated number of tokens 872 to be added to an electronic wallet 874 linked to the child 820.

Figure 10:
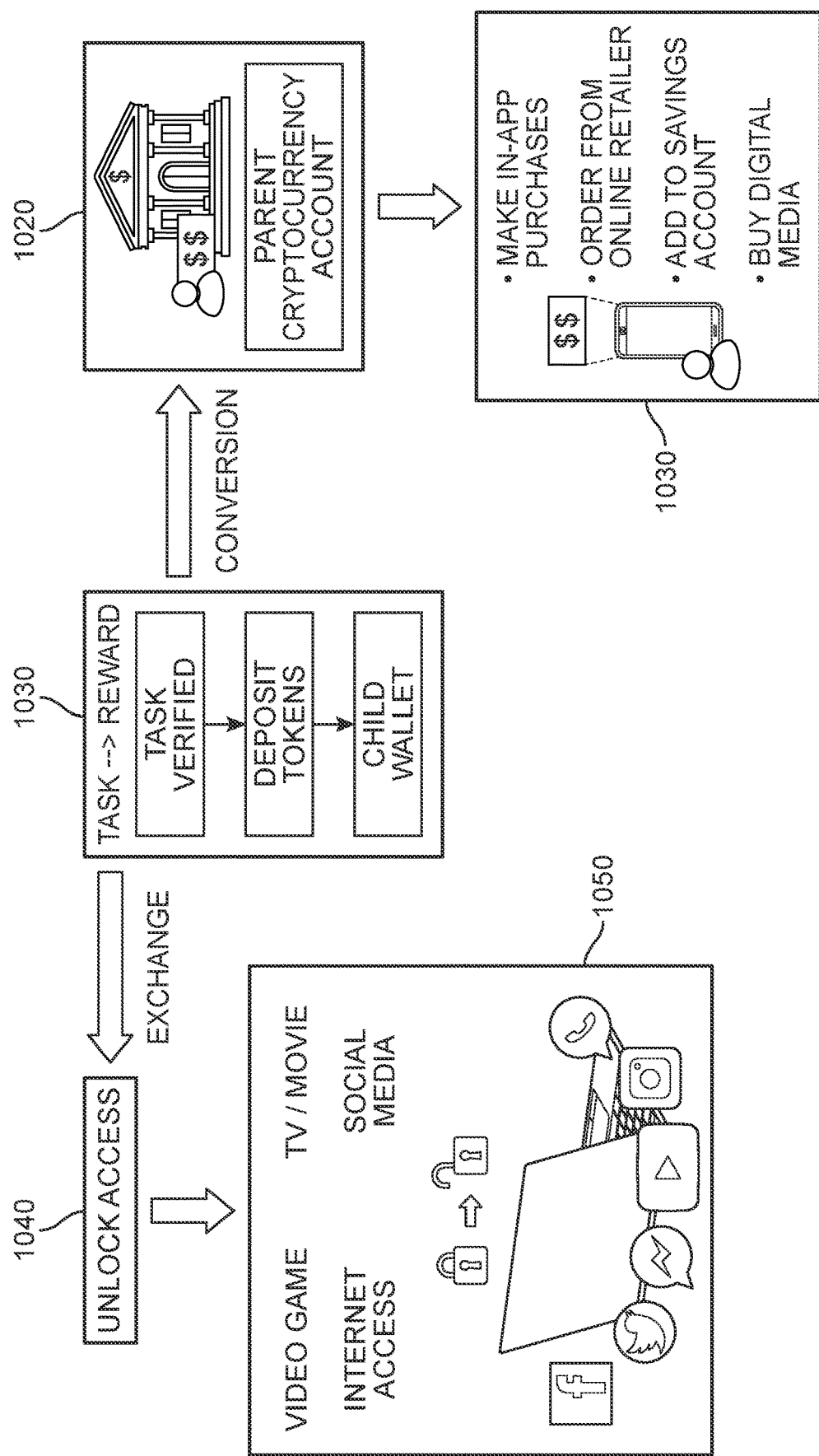
FIG. 10 is a schematic flow diagram illustrating a token-based exchange for receiving rewards, according to an embodiment.

FIG. 10 is a schematic flow diagram illustrating example reward options for use with the proposed systems. In a first operation 1010, a task can be undertaken by a child or other user, monitored, and its performance verified, triggering the release of one or more reward tokens. These tokens can then be added to the child's electronic wallet for their use. The child can then opt to use some tokens in different ways. For example, in a second operation 1020, the child may request conversion of tokens (which have no inherent value) for some currency that can be used in the real-world (has inherent value), a conversion which the system can automatically facilitate by use of the parent's private key. The currency can then be made available for the child's use, and can be used to purchase items in a third operation 1030. Alternatively, in a fourth operation 1040 the child may request that access to some device, app, or other media be 'unlocked' and the system can automatically facilitate their access to the selected media in a fifth operation 1050 with reference to the parent-provided passwords and control tools.

Figure 11:
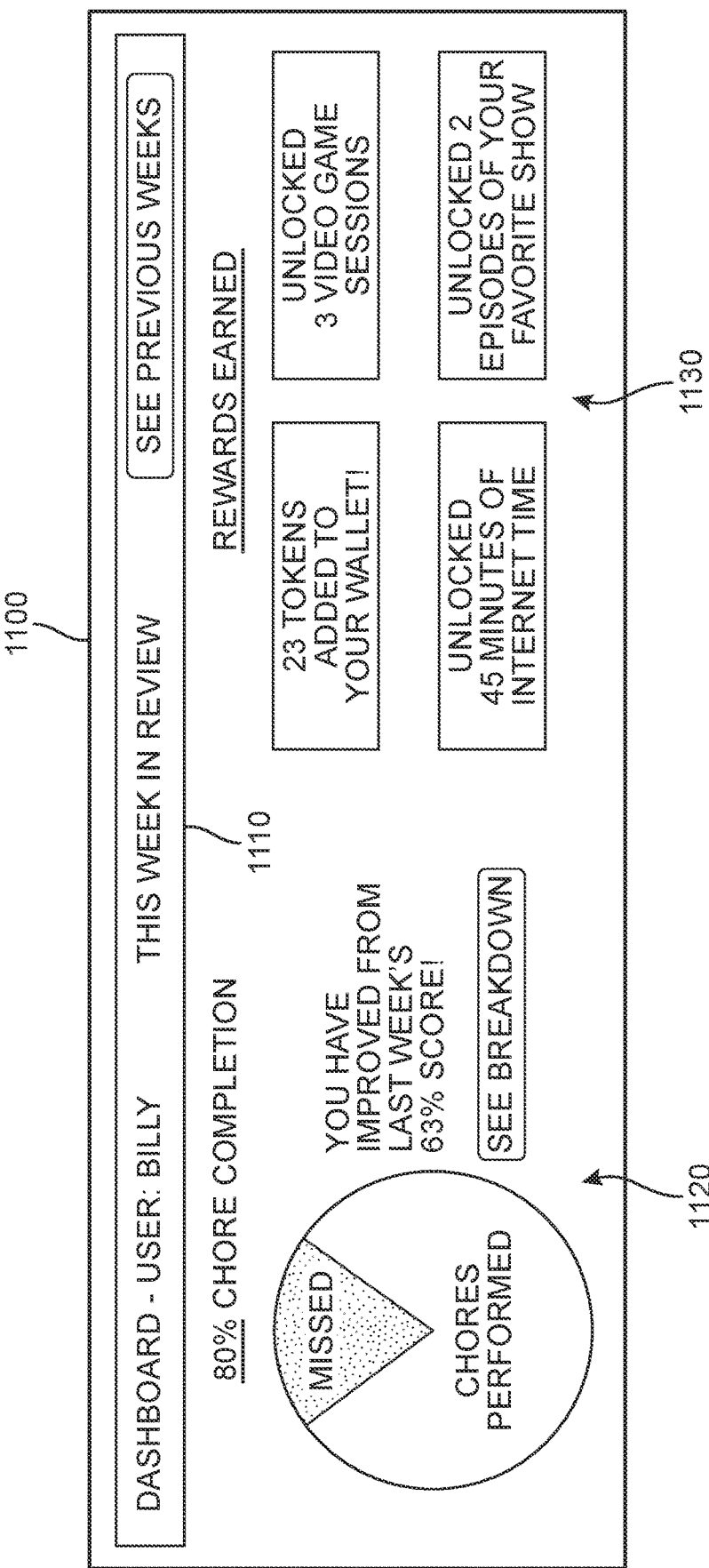
FIG. 11 is an example of a dashboard for an application by which a user can review task performance and reward data, according to an embodiment.

For purposes of illustration, an example of a user interface dashboard 1100 is presented in FIG. 11. In this example, the dashboard 1100 includes options to view metrics and other activity for the child "Billy". In different embodiments, this information can be made available by the system via the child app and/or the parent app. For example, a menu 1110 includes options for accessing past historical data (previous weeks, months, years, etc.). In FIG. 11, data for the current week is shown, including a proportion of chores completed with an infographic 1120 such as a pie chart or other graph or picture, with an option to view more details in a breakdown by different filters such as chore type, chore location (e.g., kitchen, bathroom, bedroom, vehicle, front yard, etc.), time spent performing chore (e.g., from the time the child selected the chore to the verification of the chore being performed), day of the week, etc. A rewards panel 1130 can also be presented, offering highlights of the child's earnings and/or what the tokens were used toward. In some embodiments, an additional breakdown of rewards can also be provided, enabling a view of the rewards by week (or other time), the most frequently requested reward, the reward on which the most tokens were spent (or ranked by token quantity "spent"), and current token status.

In different embodiments, the system may also be used to distribute allowance by offering tasks (e.g., chores) for selection by a child to provide insight into the type of work the child prefers. For example, a child in a household could pick a task to complete via the application. The parents may then receive a notification via the application indicating that which tasks are chosen more frequently than other tasks.

Figure 12:
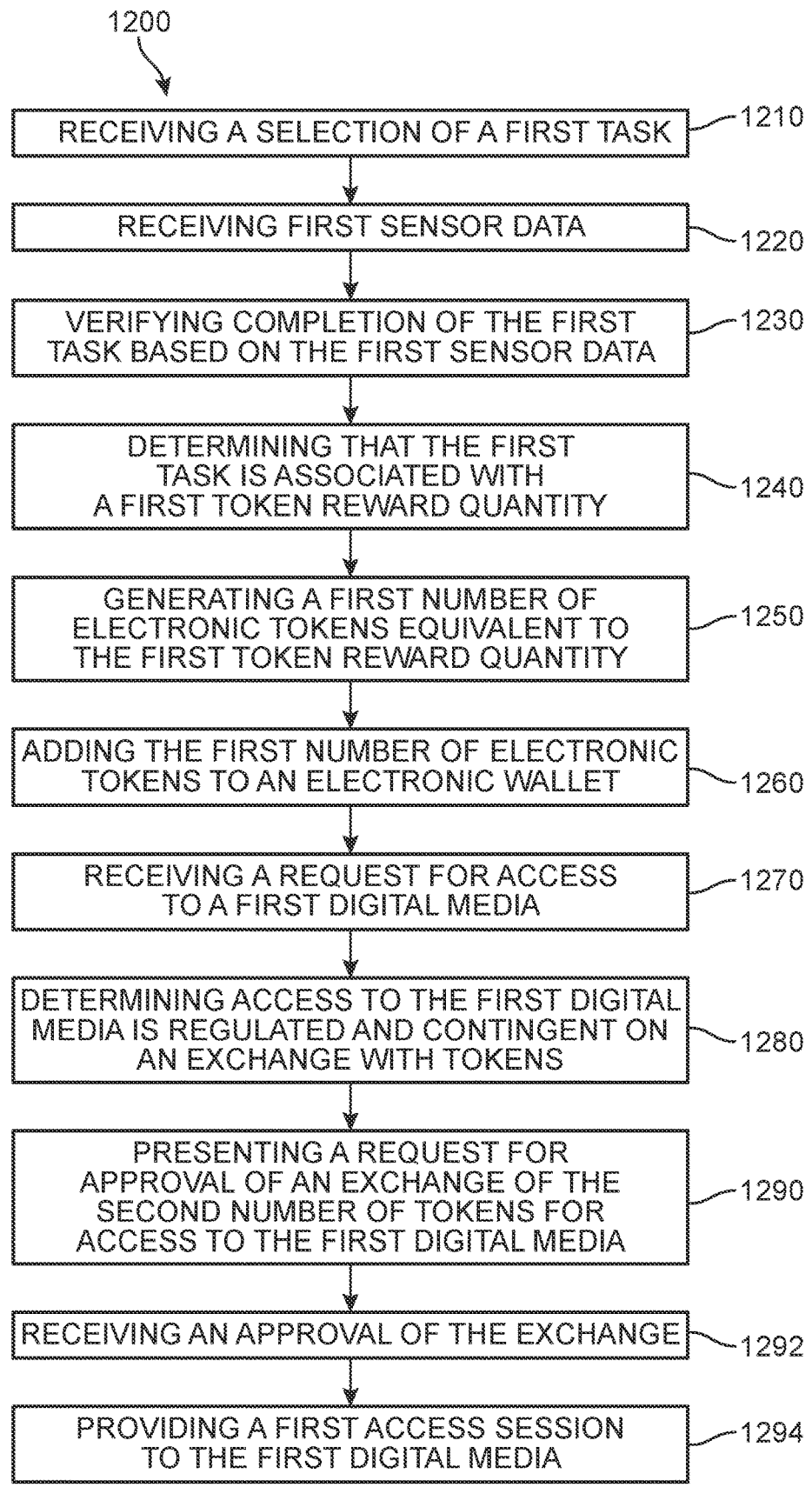
FIG. 12 is a flow chart depicting a process of incentivizing task performance, according to an embodiment.

FIG. 12 is a flow chart illustrating an embodiment of a method 1200 of incentivizing task performance. The method 1200 includes a first step 1210 of receiving, via an application for a task management system, a selection of a first task by a first user, and a second step 1220 of receiving, at the task management system, first sensor data. A third step 1230 includes automatically verifying, at the task management system, completion of the first task based on the first sensor data, and a fourth step 1240 includes automatically determining, at the task management system, that the first task is associated with a first token reward quantity. In addition, a fifth step 1250 includes automatically generating, in response to the verification, a first number of electronic tokens equivalent to the first token reward quantity, and a sixth step 1260 includes automatically adding the first number of electronic tokens to an electronic wallet for the first user. A seventh step 1270 includes receiving, via the application, a request for access to a first digital media, and an eighth step 1280 includes automatically determining, at the task management system, access to the first digital media is regulated and contingent on an exchange for a second number of tokens. In a ninth step 1290 the method includes automatically presenting, via the application, a request for the first user to approve an exchange of the second number of tokens available in the electronic wallet for access to the first digital media. A tenth step 1292 includes receiving, via the application and at the task management system, an approval of the exchange, and an eleventh step 1294 includes automatically unlocking or authorizing access to the first digital media and providing to the first user, by the task management system and at a first computing device, a first access session to the first digital media.

In other embodiments, the method may include additional steps or aspects. In one embodiment, the method also includes automatically activating, in response to receiving the selection, a first sensor device to monitor performance of the first task. In some embodiments, the method can include automatically determining the first task is associated with activity expected to occur in a first physical space of a household, and automatically determining the household includes a first sensor device that is situated in the first physical space, where activation of the first sensor device is in response to or based on determining the first sensor device is situated in the first physical space. In one embodiment, the method can further include receiving, via the application and from the first user, an indication that the first task is complete (after the selection was received), and automatically deactivating, in response to receiving the indication, the first sensor device.

In one example, the first digital media includes one of a video, game, mobile app, and social media session. In another example, the second number of tokens allows access to the first digital media for a first period of time. In some embodiments, an additional, third number of tokens is required by the task management system to continue to access the first digital media after the first period of time has expired. In different embodiments, the second number of tokens unlocks access for a remainder of the day on which the first access session was initiated. In some cases, the first sensor data includes a first image, and in such cases verifying completion of the first task can further include automatically identifying, using natural language processing techniques, first text in the first image, determining the first text includes a question, receiving, from the first sensor device, a second image, automatically identifying, using natural language processing techniques, second text in the first image, automatically determining the second text represents a good-faith effort to respond to the question. In some other embodiments where the first sensor data includes a first image, verifying completion of the first task can also include automatically comparing the first image with a reference image stored in the task management system, and automatically determining, using an image comparison algorithm, that the first image matches the reference image.

Other methods may be contemplated within the scope of the present disclosure. For example, in some embodiments, a method for incentivizing task performance can include a first step of receiving, via an application for a task management system, a selection of a first task by a first user, and a second step of automatically activating, in response to receiving the selection, a first sensor device to monitor performance of the first task. A third step can include receiving, via the application and from the first user, an indication that the first task is complete, a fourth step includes automatically deactivating, in response to receiving the indication, the first sensor device. Furthermore, the method can include a fifth step of verifying, at the task management system, completion of the first task based on first sensor data obtained via the first sensor device during its activation, and a sixth step of receiving, via the application, a request for access to a first digital media. A seventh step includes automatically determining, at the task management system, access to the first digital media is regulated and contingent on an exchange for a first number of tokens, and an eight step includes automatically presenting, via the application, a request for the first user to approve an exchange the first number of tokens available in an electronic wallet associated with the first user. A ninth step includes receiving, via the application and at the task management system, an approval of the exchange, and a tenth step includes automatically providing to the first user, by the task management system and at a first computing device, a first access session to the first digital media.

In other embodiments, the method may include additional steps or aspects. In one embodiment, the method also includes steps of automatically determining, at the task management system, that the first task is associated with a first token reward quantity, automatically generating, in response to the verification, a second number of electronic tokens equivalent to the first token reward quantity, and automatically adding the second number of electronic tokens to the electronic wallet. In another example, the method can include determining the first task is associated with an activity expected to occur in a first physical space of a household, where activation of the first sensor device is in response to determining the first sensor device is situated in the first physical space. In some embodiments, the method includes automatically debiting the first number of tokens from the electronic wallet in response to receiving the approval, and the first access session is provided after the debiting. In one example, the first digital media includes one of a video, game, mobile app, and social media session.

In some embodiments (not shown in the drawings), an interface can include a welcome or header message(s), and/or a plurality of data input fields can also be presented. Some non-limiting examples of such fields can include options directed to identification of the account owner and other users (e.g., name, phone number, address). In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present embodiments may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LAN (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front-end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments have been described, the description is intended to be exemplary, rather than limiting, and it will be apparent to those of ordinary skill in the art that many more embodiments and implementations are possible that are within the scope of the embodiments. Accordingly, the disclosed embodiments are not to be restricted except in light of the attached claims and their equivalents. Also, various modifications and changes may be made within the scope of the attached claims.

We claim:

1. A method of incentivizing task performance, the method comprising:
   receiving a selection of a first task by a first user via an application for a task management system, the application running by the execution of instructions stored on a non-transitory computer readable medium by a device processor;
   determining the first task is associated with activity expected to occur in a first physical space of a household;
   determining the household includes a first sensor device that is situated in the first physical space;
   automatically activating, in response to determining the first sensor device is situated in the first physical space, the first sensor device to monitor performance of the first task;
   receiving, at the task management system, first sensor data from the first sensor device;
   wherein the first sensor data includes a first image, and wherein verifying completion of the first task further comprises:
   identifying, using natural language processing techniques, first text in the first image;
   determining the first text includes a question;
   receiving, from the first sensor device, a second image;
   identifying, using natural language processing techniques, second text in the second image; and
   determining the second text represents a good-faith effort to respond to the question in the first text;
   determining, at the task management system, that the first task is associated with a first token reward quantity;
   automatically generating, in response to the verification, a first number of electronic tokens equivalent to the first token reward quantity;
   adding the first number of electronic tokens to an electronic wallet for the first user;
   receiving, via the application, a request for access to a first digital media;
   determining, at the task management system, access to the first digital media is regulated and contingent on an exchange for a second number of tokens;
   presenting, via the application, a request for the first user to approve an exchange of the second number of tokens available in the electronic wallet for access to the first digital media;
   receiving, via the application and at the task management system, an approval of the exchange; and
   providing to the first user, by the task management system and at a first computing device, a first access session to the first digital media;
   the method further comprising:
   receiving, via the application and from the first user, an indication that the first task is complete; and
   automatically deactivating the first sensor device in response to receiving the indication that the first task is complete.

2. The method of claim 1, wherein the first digital media includes one of a video, game, mobile app, e-book, audiobook, music, magazines, journals, articles, audio file, podcast, and social media session.

3. The method of claim 1, wherein the second number of tokens allows access to the first digital media for a first period of time.

4. The method of claim 3, wherein an additional, third number of tokens is required by the task management system to continue to access the first digital media after the first period of time has expired.

5. The method of claim 1, wherein the second number of tokens unlocks access for a remainder of the day on which the first access session was initiated.

6. A method of incentivizing task performance, the method comprising:
   receiving a selection of a first task by a first user via an application for a task management system, the application running by the execution of instructions stored on a non-transitory computer readable medium by a device processor;
   determining the first task is associated with activity expected to occur in a first physical space of a household;
   determining the household includes a first sensor device that is situated in the first physical space;
   automatically activating, in response to determining the first sensor device is situated in the first physical space, the first sensor device to monitor performance of the first task;
   receiving, via the application and from the first user, an indication that the first task is complete;
   automatically deactivating the first sensor device in response to receiving the indication that the first task is complete;
   verifying, at the task management system, completion of the first task based on first sensor data obtained via the first sensor device during its activation;
   wherein the first sensor data includes a first image, and verifying completion of the first task further comprises:
   identifying, using natural language processing techniques, first text in the first image;
   determining the first text includes a question;
   receiving, from the first sensor device, a second image;
   identifying, using natural language processing techniques, second text in the second image; and
   determining the second text represents a good-faith effort to respond to the question in the first text;
   the method further comprising:
   receiving, via the application, a request for access to a first digital media;
   determining, at the task management system, access to the first digital media is regulated and contingent on an exchange for a first number of tokens;
   presenting, via the application, a request for the first user to approve an exchange of the first number of tokens available in an electronic wallet associated with the first user;
   receiving, via the application and at the task management system, an approval of the exchange; and
   providing to the first user, by the task management system and at a first computing device, a first access session to the first digital media.

7. The method of claim 6, further comprising:
   determining, at the task management system, that the first task is associated with a first token reward quantity;
   automatically generating, in response to the verification, a second number of electronic tokens equivalent to the first token reward quantity; and
   adding the second number of electronic tokens to the electronic wallet.

8. The method of claim 6, further comprising automatically debiting the first number of tokens from the electronic wallet in response to receiving the approval, and the first access session is provided after the debiting.

9. The method of claim 6, wherein the first digital media includes one of a video, game, mobile app, e-book, audiobook, music, magazines, journals, articles, audio file, podcast, and social media session.

10. A system for incentivizing task performance, the system comprising a processor and non-transitory computer readable medium including instructions which, when executed by the processor, cause the processor to perform the following steps:
- receiving, via an application for a task management system, a selection of a first task by a first user;
- determining the first task is associated with activity expected to occur in a first physical space of a household;
- determining the household includes a first sensor device that is situated in the first physical space;
- automatically activating, in response to determining the first sensor device is situated in the first physical space, the first sensor device to monitor performance of the first task;
- receiving, at the task management system, first sensor data;
- verifying, at the task management system, completion of the first task based on the first sensor data;
- wherein the first sensor data includes a first image, and verifying completion of the first task further comprises:
- identifying, using natural language processing techniques, first text in the first image;
- determining the first text includes a question;
- receiving, from the first sensor device, a second image;
- identifying, using natural language processing techniques, second text in the second image; and
- determining the second text represents a good-faith effort to respond to the question in the first text;
- the steps further including:
- identifying, at the task management system, that the first task is associated with a first token reward quantity;
- automatically generating, in response to the verification, a first number of electronic tokens equivalent to the first token reward quantity;
- adding the first number of electronic tokens to an electronic wallet for the first user;
- receiving, via the application, a request for access to a first digital media;
- determining, at the task management system, access to the first digital media is regulated and contingent on an exchange for a second number of tokens;
- presenting, via the application, a request for the first user to approve an exchange of the second number of tokens available in the electronic wallet for access to the first digital media;
- receiving, via the application and at the task management system, an approval of the exchange; and
- providing to the first user, by the task management system and at a first computing device, a first access session to the first digital media;
- the steps further including:
- receiving, via the application and from the first user, an indication that the first task is complete; and
- automatically deactivating the first sensor device in response to receiving the indication that the first task is complete.

* * * * *